United States Patent
Robinson

(10) Patent No.: US 8,315,931 B2
(45) Date of Patent: Nov. 20, 2012

(54) SYSTEM FOR DETERMINING HIGH QUALITY MUSICAL RECORDINGS

(76) Inventor: Gary Robinson, Bangor, ME (US)

( * ) Notice: Subject to any disclaimer, the term of this patent is extended or adjusted under 35 U.S.C. 154(b) by 0 days.

(21) Appl. No.: 12/857,429

(22) Filed: Aug. 16, 2010

(65) Prior Publication Data

US 2010/0306124 A1 Dec. 2, 2010

Related U.S. Application Data

(63) Continuation-in-part of application No. 11/423,577, filed on Jun. 12, 2006, now Pat. No. 7,860,741, which is a continuation of application No. 09/714,789, filed on Nov. 16, 2000, now Pat. No. 7,072,846, said application No. 12/857,429 is a continuation of application No. 10/117,356, filed on Apr. 5, 2002, which is a continuation-in-part of application No. 09/691,316, filed on Oct. 18, 2000.

(60) Provisional application No. 60/165,794, filed on Nov. 16, 1999, provisional application No. 60/281,673, filed on Apr. 5, 2001, provisional application No. 60/160,044, filed on Oct. 18, 1999, provisional application No. 60/166,430, filed on Nov. 19, 1999, provisional application No. 60/176,154, filed on Jan. 14, 2000, provisional application No. 60/200,204, filed on Apr. 28, 2000, provisional application No. 60/209,930, filed on Jun. 7, 2000, provisional application No. 60/218,866, filed on Jul. 18, 2000, provisional application No. 60/232,742, filed on Sep. 15, 2000, provisional application No. 60/176,953, filed on Jan. 18, 2000, provisional application No. 60/182,836, filed on Feb. 16, 2000, provisional application No. 60/194,988, filed on Apr. 5, 2000.

(51) Int. Cl.
*G06Q 40/00* (2006.01)

(52) U.S. Cl. .......................................................... 705/35
(58) Field of Classification Search .................. 705/35, 705/500
See application file for complete search history.

(56) References Cited

U.S. PATENT DOCUMENTS

| 5,034,807 A | * | 7/1991 | Von Kohorn | 725/5 |
| 5,913,204 A | * | 6/1999 | Kelly | 705/500 |
| 5,950,172 A | * | 9/1999 | Klingman | 705/27.1 |

(Continued)

OTHER PUBLICATIONS

Konstan et al.: GroupLens: Applying Collaborative Filtering to Usenet News, Mar. 1997, Communication of the ACM, Vo. 30, No. 3, pp. 77-87.*

(Continued)

*Primary Examiner* — Bijendra K Shrestha
(74) *Attorney, Agent, or Firm* — Gerry J. Elman; Elman Technology Law, P.C.

(57) ABSTRACT

A system for determining high quality musical recordings comprises a server computer which communicates with a plurality of client devices configured to execute internet radio client software which plays musical recordings. The server computer includes a registration unit for registering users; an input unit for registering, for each user, and for each musical recording of a selected group of musical recordings, a user's opinion of the musical recording. It also includes a combining unit configured to combine a user's registered opinion of each of the musical recordings with the registered opinions of other users, an input valuation unit configured to assign a valuation to the registered opinions on the basis of data from the combining unit, and a reward unit for providing a reward to one or more users on the basis of a valuation provided by the input valuation unit.

8 Claims, 2 Drawing Sheets

U.S. PATENT DOCUMENTS

Figure 1:
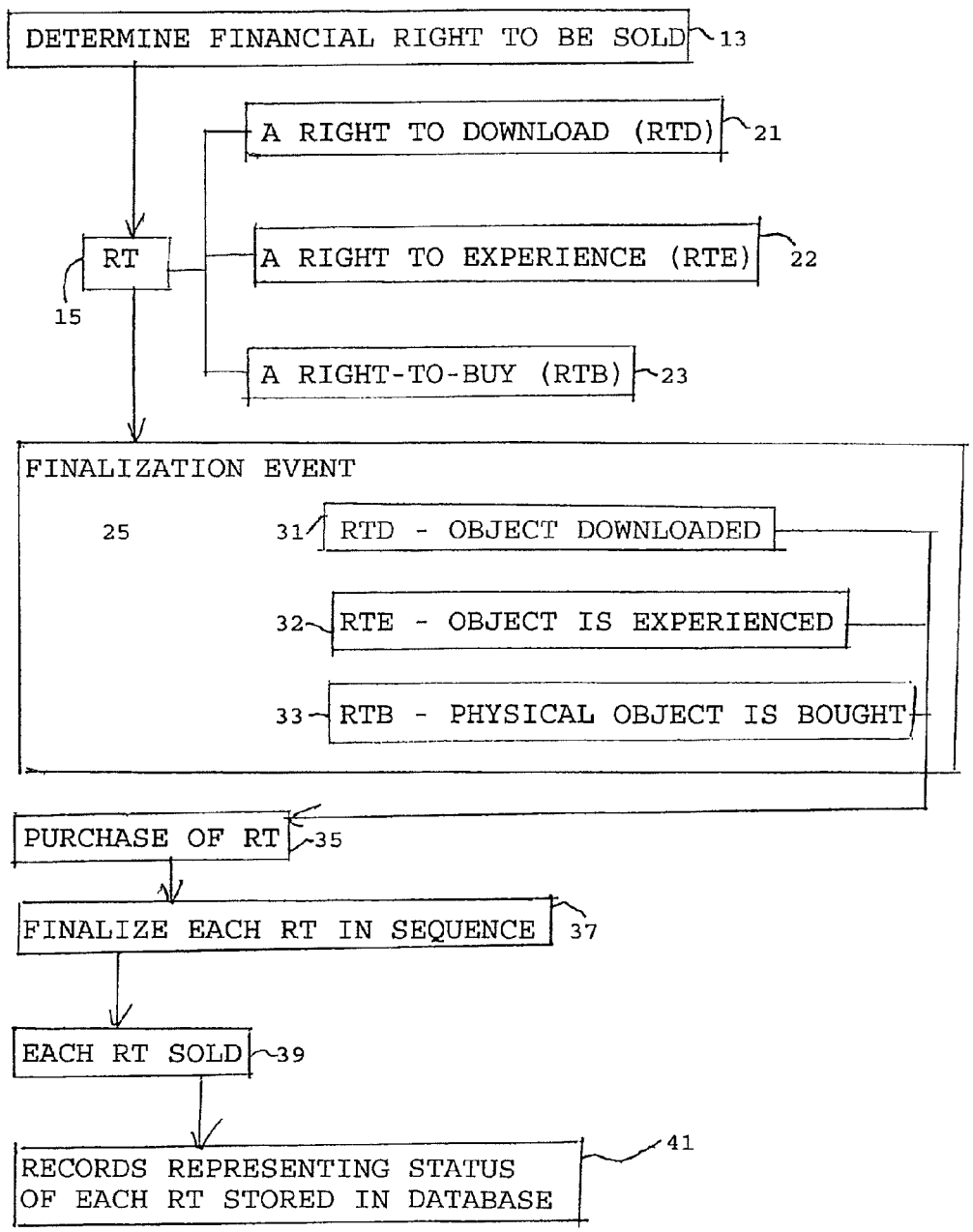

| | | | | |
|---|---|---|---|---|
| 6,405,175 | B1 * | 6/2002 | Ng | 705/14.26 |
| 6,499,023 | B1 * | 12/2002 | Dong et al. | 706/46 |
| 7,096,194 | B2 * | 8/2006 | Johnson | 705/35 |
| 7,143,089 | B2 * | 11/2006 | Petras et al. | 707/749 |
| 7,200,644 | B1 * | 4/2007 | Flanagan | 709/219 |
| 7,319,863 | B2 * | 1/2008 | Engstrom et al. | 455/414.3 |
| 2009/0233563 | A1 * | 9/2009 | Eubanks | 455/186.1 |

OTHER PUBLICATIONS

Hendel et al.: The Role of Student Opinion in Assisting Students in Making Course Selection Decisions, May 1, 1997, University of Minnesota, pp. 1-34.*

Volz et al.: Demand for Distribution Services, Stars and Variety in Online Music Industry, Aug. 19, 1999, University of Frankfurt, Germany, pp. 1-16.*

* cited by examiner

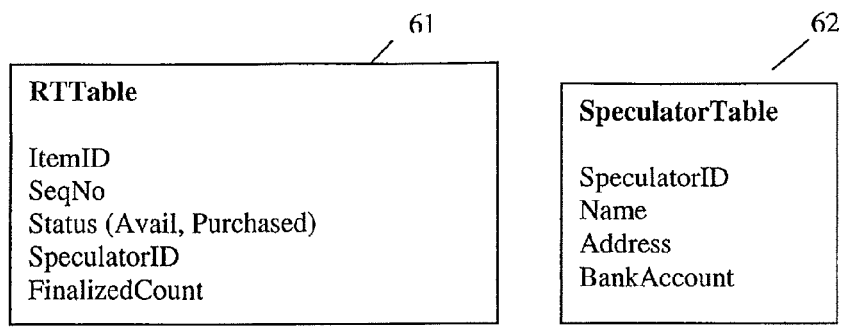
Figure 2. Database Tables
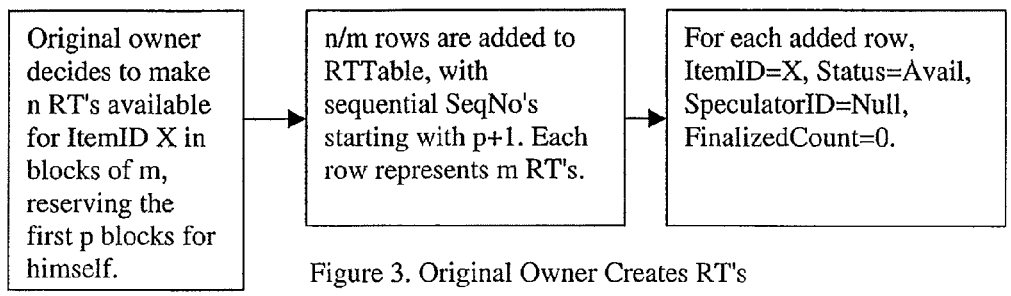
Figure 3. Original Owner Creates RT's
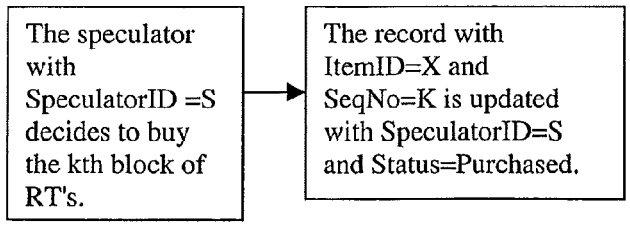
Figure 4. Speculator Buys RT's
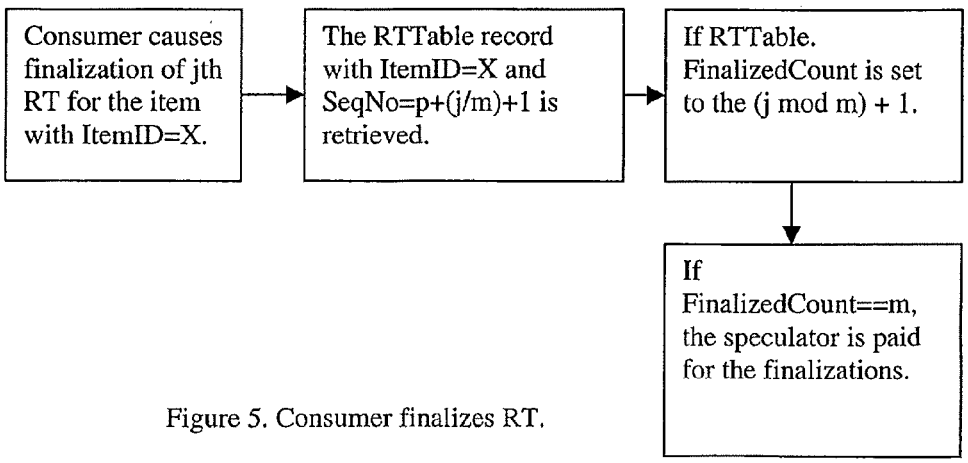
Figure 5. Consumer finalizes RT.

SYSTEM FOR DETERMINING HIGH QUALITY MUSICAL RECORDINGS

CROSS-REFERENCE TO RELATED APPLICATIONS

This application is a continuation-in-part of and claims priority under 35 U.S.C. §120 to U.S. patent application Ser. No. 11/423,577 filed Jun. 12, 2006, issuing as U.S. Pat. No. 7,860,741 on Dec. 28, 2010. U.S. patent application Ser. No. 11/423,577 is a continuation of and claims priority to U.S. patent application Ser. No. 09/714,789, which was filed Nov. 16, 2000 and which issued on Jul. 4, 2006 as U.S. Pat. No. 7,072,846. U.S. patent application Ser. No. 09/714,789 claims priority to U.S. Provisional Patent Application No. 60/165,794, filed Nov. 16, 1999. The entire contents of the aforementioned patent applications are incorporated herein by reference.

This application is a continuation of U.S. Non-Provisional patent application Ser. No. 10/117,356, filed Apr. 5, 2002. The entire contents of the aforementioned patent application are incorporated herein by reference.

patent application Ser. No. 10/117,356 claims priority from U.S. Provisional Patent Application No. 60/281,673, filed Apr. 5, 2001 and patent application Ser. No. 10/117,356 claims priority as a continuation-in-part application from U.S. patent application Ser. No. 09/691,316, filed, Oct. 18, 2000.

The entire contents of the aforementioned patent application are incorporated herein by reference, which claims priority from the following U.S. Provisional Patent Applications:

Community-Based Market Movement Prediction: No. 60/160,044; filed Oct. 18, 1999
Portfolio Management By Community; No. 60/166,430; filed Nov. 19, 1999
Clusters for Rapid Artist-Audience Matching: No. 60/165,794; filed Nov. 19, 1999
A Mechanism for Quickly Identifying High-Quality Items: No. 60/176,154; filed Jan. 14, 2000
A Mechanism for Quickly Identifying High-Quality Items Version 000118: No. 60/176,953 filed Jan. 18, 2000
A Mechanism for Quickly Identifying High-Quality Items Version 000216; No. 60/182,836 filed Feb. 16, 2000
A Mechanism for Quickly Identifying High-Quality Items Version 000405; No. 60/194,988 filed Apr. 5, 2000
A Mechanism for Quickly Identifying High-Quality Items: No. 60/200,204; filed Apr. 28, 2000
A Mechanism for Quickly Identifying High-Quality Items: No. 60/209,930; filed Jun. 7, 2000
A Mechanism for Quickly Identifying High-Quality Items: No. 60/218,866; filed Jul. 18, 2000
A Mechanism for Quickly Identifying High-Quality Items: No. 60/232,742; filed Sep. 15, 2000.

The entire contents of the aforementioned patent application are incorporated herein by reference. The entire disclosures thereof of the above-enumerated United States Provisional Patent Applications, including the specifications, drawings, and abstracts, are hereby incorporated herein by reference.

The entire contents of U.S. patent application Ser. No. 09/714,789, filed, Nov. 16, 2000, are incorporated herein by reference, including the specifications, drawings, and abstracts, are hereby incorporated herein by reference.

COMPACT DISC INCORPORATION BY REFERENCE

Applicant hereby incorporates by reference the entire contents of the material on the compact disc submitted Jul. 26, 2012, and as listed below. The disc was created Jul. 25, 2012. Applicant submits two individual compact discs, each being identical to the other.

The file names have .txt extensions and are in ASCII format.

| Size | Mon | Day | Year | File |
|------|------|-----|------|------|
| 4096 | July | 24 | 2012 | Appendix_B.txt |
| 36864 | July | 24 | 2012 | Appendix_C.txt |

SUMMARY OF THE INVENTION

The invention involves some or all of an Input Unit, a Combining Unit, an Input Valuation Unit, and a Reward Unit (this list is not meant to be inclusive).

The Input Unit is a facility or medium in which users can register opinions.

The Combining Unit is a calculating mechanism accepting input received from a plurality users and combining it into a single value.

The Input Valuation Unit has responsibility for determining the value of each user's input to the system.

The Reward Unit's purpose is to provide incentive for users to do the filtering and discovery work necessary to unearth the valuable items.

DETAILED DESCRIPTION OF THE INVENTION

The invention involves some or all of an Input Unit, a Combining Unit, an Input Valuation Unit, and a Reward Unit (this list is not meant to be inclusive).

The Input Unit is a facility or medium in which users can register opinions. A non-inclusive, list of workable Input Units is: an electronic listing of musical recordings with attached means for the input of ratings of those recordings, an electronic listing of securities with input means for predictions of price movements of those securities, and "message board" or "discussion group" software in which messages can be rated by the readers of those messages.

The Combining Unit is a calculating mechanism accepting input received from a plurality users and combining it into a single value. In various embodiments, arithmetic averaging, geometric averaging, meta-analytical, or Bayesian calculations, among other possibilities, are used. Bayesian expectations based upon the beta or Direchlet distributions are among the applicable Bayesian calculations. Meta-analytical calculations include the inverse normal method and Fisher's inverse chi-square method. The Combining Unit is used to detect an overall group opinion, such as stock market prediction or rating of a message, in the input given by users regarding an item.

When using the inverse normal meta-analytical method, a correlation matrix between the various users' ratings can be calculated and used in calculating the combined p-value.

The Input Valuation Unit has responsibility for determining the value of each user's input to the system.

The key values involved in this calculation are the accuracy, timeliness, and volume of the user's ratings. However various embodiments may also incorporate to other values, or leave one or more of the mentioned values out of the calculations.

Some embodiments do this by assigning a value to every rating individually, then summarizing this information to create an assessment of the user who generated those ratings. Some embodiments never create an individual value for each rating, but rather use the ratings supplied by each user in toto to calculate an overall valuation of the individual's contributions.

The key attributes which are considered by the calculations for the value of individual ratings are their timeliness and accuracy.

In various embodiments, accuracy measurements for individual ratings are based on the difference between the individual's rating and the population average, the absolute value of that difference, the square of that difference, and other calculations that are representative of what is intuitively understood as the general degree of nonsimilarity between two values. In some such embodiments the individual's rating is ignored in counting the population average. In some others all ratings supplied earlier than the one in question are ignored due to their possible influence on the mindset of the rater.

Accuracy measurements for the individual's overall contribution may be created by first calculating accuracy for the individual ratings and then calculating their (arithmetic or geometric) average or a Bayesian expectation or a z-score of statistical significance calculation for any tendency toward accurate or inaccurate ratings, or, in still further embodiments, other approaches are used. Alternatively, no measure of the individual value of each rating is calculated, and instead, an overall measure such as statistical correlation is used. When correlation is used, the correlation is measured between the user's ratings and the population averages, which, in various embodiments, may exclude the user's ratings and/or all previous ratings. Some other embodiments use such techniques as normalizing the difference between the individual rating and the population to be a real number between 0 and 1 which is uniformly distributed under the null hypothesis of randomness; such normalization techniques enable further statistical calculations to be carried out, such as combining these differences (which can now be considered to be p-values) using meta-analytical calculations including the inverse normal technique and Fisher's inverse chi-square technique. Some other embodiments calculate a Bayesian expectation of these differences, where the difference are or are not normalized, according to the particular embodiment. This list, like other such lists in the summary, however, is for purposes of example only and is not meant to be inclusive.

Where population averages are mentioned in the above paragraphs, some implementations use a Bayesian expectation of the next rating generated by the population rather than use the average itself.

When Bayesian expectations are mentioned, various embodiments base such calculations on the beta and Direchlet distributions, and other distributions.

In some embodiments which work in conjunction with external markets such as stock prices on the New York Stock Exchange, accuracy is determined by comparing the predictions of users with the valuations that eventually emerge in the market. A prediction that a stock will have a certain price at a future date and time can be considered a rating of the stock. If that rating differs from the current price, the rater is saying that he disagrees with the overall ratings currently provided by the community as a whole, but thinks that the community will agree with him at the future date and time. Thus some of accuracy calculations described above, such as the correlation between the user's rating and the rating the community as a whole, are calculated in various such embodiments.

Similarly, in embodiments where the items being rated are Web pages (identified by URL's), the ultimate opinion of the community of a page is reflected in the relative number of links, taken from across the Web, that ultimately point to that page. Calculations in this and other cases similar in their basic natures (although not necessarily involving URL's or stock prices) are carried out similarly.

In some embodiments users don't predict specific prices. Instead they make simpler predictions such as the direction of movement. In one such embodiment, the user can predict an upward or downward movement, or make no prediction at all if he thinks the situation will stay the same or if he doesn't feel he has cause to predict one way or the other. On this basis, a 0 or 1 is assigned as the rating, depending on whether the prediction is for a downward or upward movement, in that order. Then, at the time the prediction is supposed to have taken place, the system determines the actual direction of movement. If the stock has gone down, a 0 is assigned as the rating marketplace's rating. If it stayed the same, 0.5 is assigned. If it went up, 1 is assigned. Then, the correlation is calculated as described elsewhere between the individual's rating and the overall rating. In other similar embodiments, other calculations are used to determine the accuracy.

Timeliness is another key value used by the Input Valuation Unit in many embodiments. It refers to how early a rating is inputted by the user, since the earlier a rating is inputted, the less likely it is to be influenced by other people's ratings of the same item, and therefore the more likely it is to reflect the user's actual prescience in predicting the ultimate opinion of the population. Timeliness is not always included in the calculations, however; for instance, in embodiments where there is no way for users to "cheat" by only giving their own ratings after they have seen the ratings of others, timeliness becomes less important or even irrelevant. An example of this is cases where ratings are not made public until a certain point in time, when the overall opinion of the population is calculated and displayed.

Various embodiments use various techniques for calculating the timeliness value.

The most basic calculation simply counts the number of ratings of the item which are previous to the rating in question; the "best" timeliness value, then, is 0.

In some embodiments it is considered to be mathematically convenient to have a number between 0 and 1. For instance, in many such embodiments, $1/n$, or $1-1/n$, where n is the position of the rating in time ($1^{st}$, $2^{nd}$, and so on), is used. In some others, $n/N$, where N is the total number of ratings for the item, is used, which we consider to be a ranking normalized to the unit interval (and the normalized rank of a randomly chosen user is uniformly distributed on that interval). One key difference between these calculations is the fact that the calculations based on $1/n$ are scaled such that small differences in the lower values of n have more import than small differences between large of n. That is 1/1 is quite different from 1/2 (remembering that the range is 0 to 1), but 1/999 is not very different from 1/1000. This is consistent with the intuitive fact that the user inputting the first rating for an item has no chance of "freeloading" by copying the rating of anyone else, while the second user to rate can copy the first rating; that first rating, if the first user is skilled at rating, may accurately reflect the eventual average rating of the entire population; this would enable the second user to appear to be an accurate rater when in fact he is only an accurate copier. Similarly, the $3^{rd}$ rater can use the average of the first two ratings, but the value of being able to use 2 prior ratings rather than 1 is less than the value of being able to use 1 rather than 0.

The cumulative exponential distribution provides another technique for calculating a timeliness value that gives more importance to differences in small n's, and has certain theoretical advantages as well.

However, timeliness values based on a uniform distribution have the advantage of being p-values under the null hypothesis of randomness, and therefore are amenable to meta-analytical combining techniques for combining the timeliness with the accuracy and/or volume of the user's ratings to calculate a statistical significance, in embodiments where those values, too, can be considered to be p-values.

Some values combine the timeliness of the rating under consideration (for instance, the number of earlier ratings) with the total number of ratings, due to the fact that when there are more ratings, the population average is more meaningful. Ranking (comparing the number of ratings for the current item to the number of ratings for other items), exponential and other calculations similar to those already described are used to derive a value representing the magnitude of the collection of ratings for the item in question are used in various embodiments; then these two timeliness-related values are combined by multiplication or other means.

When an embodiment involves long-term items such as stocks which have values that change over time, and for which an individual rating can be made, at any time or at many times, regarding the future community rating of the item, some of the timeliness calculations mentioned above, which assume a first rating, are not applicable. In such embodiments other mechanisms are used. One example is a set of embodiments that allow individuals to make predictive ratings regarding the question of what the community rating will be at some time in the future, also specified by the individual. One such embodiment calculates the difference between the time a rating is made, and the time the rater expects the community to agree with him (an example being a prediction that a stock will reach a certain price at a certain date and time in the future). The average such difference is calculated for each individual, and than the differences are ranked. This ranking is made into a unit interval rank and is used similarly to the other timeliness calculations already described.

Thus a user can obtain a better reputation for adding value to the system by making longer-range stock market predictions, assuming such predictions tend to be as accurate as those of someone else who tends to make shorter term predictions.

The volume value, representing the number of ratings inputted by a given user, in various embodiments, is also massaged by means similar to those already described. A rank on the unit interval is, in some embodiments, created by comparing the current user's volume to the volume of ratings generated by other users; in others the number of ratings generated by the current user is used to divide one; in others a cumulative exponential distribution is computed; in others other massaging techniques are used.

One or more of the values of accuracy, timeliness, and volume are then combined with each other and/or with other values to compute an overall valuation of an individual's ratings.

Some preferred embodiments do this by multiplying values which have all been normalized to the unit interval and such that the best value in each case is 1. The product will only be near 1 if all of the factors are near 1, meaning that the user's ratings tend to be accurate and timely, and that he generates a good number of ratings. In one preferred embodiment, accuracy is calculated by the correlation between the user's ratings and the population average, timeliness is calculated by 1/n, and volume is calculated by ranking the users according to each user's volume of ratings and generating a unit interval rank such that, if M is the number of users, the best rank is M/M (that is, 1) and the worst is 1/M. These values are multiplied together; the users who add the most value with their ratings will have a product near 1. In some variants of these embodiments, weights are applied by taking one or more of the values to be multiplied to a power. For instance, if it wants to tune the system to motivate users to generate more ratings, and embodiment can square the volume value before multiplying it with the other values.

Some other embodiments using ranking techniques to generate unit interval ranks for all values to be considered as p-values which, under the null hypothesis that all rankings are random, can be combined via meta-analytical techniques to generate a combined p-value representing the confidence with which we can reject that null hypothesis (i.e., accept the conclusion that the combined p-value is near an extreme because all the values are good). In some meta-analytical techniques, weights can be applied to the p-values being combined, analogously to applying weights before multiplying the values.

When using the inverse normal meta-analytical method, a correlation matrix between the three variables to be combined can be calculated and used in calculating the combined p-value. (This example should not be construed to exclude other ways of taking advantage of the correlation matrix.)

Other embodiments use such techniques as simple arithmetic averaging and computing a Bayesian expectation.

The Reward Unit's purpose is to provide incentive for users to do the filtering and discovery work necessary to unearth the valuable items, be they stock picks, songs, messages on message boards, or other kinds of items.

One set of embodiments involves Reward Units that are based on providing earlier access to timely information to the people that add the most value to the system. This is the Early Access Unit.

For instance, some embodiments look for cases where several people are making similar predictions for stock market movements, where those people have a record for accuracy in past predictions, and when the agreement of so many people is unlikely to be due to chance alone. Thus, such a combined prediction may be of value. Since the earlier an investor knows what is going to happen in the stock market, the more likely he can make money from that knowledge, it can be expected that an investor who is also a rater in a system built on this invention would be motivated to provide a greater number of earlier, more accurate predictions so that he will get, in a more timely fashion, the benefit of the system's searches for unusual agreement among predictions.

Other embodiments of the Early Access Unit are applicable to online message boards. Sites such as The Motley Fool's fool.com allow users to enter ratings for messages in their message boards. Users who subsequently come to the board then have the benefit of this screening and can avoid messages that are less highly-rated. This is considered to be a valuable service. Therefore embodiments which stagger the time elapsed before a user gets to see a rating provide a way to reward certain individuals.

In one such embodiment, the rating summarization to be displayed on the board are calculated once per minute, in two different versions. The "elite" version summarizes the ratings based on all ratings that have been received up to that point in time. (Summarization takes various forms in different embodiments; for instance, in some embodiments it simply consists of counting the number of "thumbs up" ratings received by an item.) Thus, this elite version is the same as most current presentations. The "normal" version ignores all ratings submitted within some time period, for instance, the most recent 15 minutes. Thus, such an embodiment can present the elite display to the few people who contribute the most to the system through timely, accurate, and voluminous ratings, whereas most people would see the normal version. In other embodiments, many different levels of display are used rather just two, up to the extreme of having a slightly different delay period for each user.

The Early Access Unit is only worthwhile as a motivator in domains where timeliness is important. A discussion group focusing on news relevant to the state of the stock market, populated by serious investors (particularly day-traders), is one such domain. A discussion group populated by general news professionals, trying to get the latest scoop before the population in general, would be another example. Note that in domains such as the one in this paragraph, a way for a user to improve his timeliness ratings is to submit his own message, which would be a valuable message, and to rate it highly. That way he is assured a perfect timeliness value for that item. (Note that in most such embodiments, the populations ultimate rating of items submitted by a user is part of the overall calculation for the value added by the user to the system.)

Another set of embodiments use a Reward Unit we will refer to as the Public Reputation Unit. The purpose of this unit is to reward people who contribute timely, accurate, and/or voluminous ratings to the system through publicly enhancing their reputation.

Various embodiments do this by such means as presenting a ranked list of the top contributors (akin to the lists of top scorers seen in many video games) and providing a summary of the user's contributions when a page dedicated to the user is brought up.

Some embodiments provide the opportunity for users with the highest reputations to be paid for making further contributions in the form of ratings. The preferred subsets of such embodiments do this in such a way that it is not possible for a user o motivate the to "cheat" by doing things like always giving positive ratings in order to motivate the people who create items to pay him to rate their new items.

For example, consider an embodiment in the field of music. Musicians will want their songs to be gain more attention by getting a high rating on a listing of new music. But, there is so much new music emerging every day, just getting enough attention for users to discover the music and rate it is a major challenge in itself. Thus, it would behoove musicians to pay raters to rate their music (that is, as long as the believed that their music was good enough to be rated highly!) This embodiment of the current invention presents a list of users, identifying them by their online ID's and not by their real identities, and listing the degree to which they have contributed to the system. It does not show the average of the ratings they have inputted or any other indication of how high the ratings have been. Instead it presents the ranking of each user as a contributor to the system, where the best contributors have the most accurate ratings, the most timely ratings, and have a high volume of ratings (the calculations for combining these values in order to rank by the combined value are described elsewhere in the present document). When a musician is choosing who to pay, and the musician believes his music will be rated highly (otherwise he should give up and go home), he will be motivated to pay the highest-ranked raters, since part of the rating is accuracy, and this musician believes that an accurate rating will be a high one. At the same time, the musician is also rewarding raters who give a high number of timely ratings, even though the musician may not care about rewarding those things. This embodiment also provides mechanisms by which raters can post suggested fees and musicians can enter their credit card numbers in order to cause money to be transferred to the raters. Various embodiments in other domains use similar techniques.

In some embodiments prizes are awarded to the most contributing user or users; the service displays a notice about a prize or prizes that will be awarded to the top user(s) on a particular date, and this motivates the users to contribute accurate and timely ratings in order to increase their chances of winning a prize.

Another set of embodiments is particularly beneficial for companies which market products to consumers. A notice is given that monetary prizes or free products will be given to the best contributors. The subject of the ratings is messages on a message board which is devoted to product improvement suggestions. When the accuracy of ratings is calculated, it is compared not to the community's combined rating, but to an the value that is assigned to the item by the sponsoring company. One embodiment assigns a 1 if management decides that a suggestion will be implemented and 0 if it is not, whereas ratings from users have multiple levels ("poor", "below average", "average", "good", "excellent", translated in the software to 0, 0.25. 0.5. 0.75. and 1, for example). This mismatch does not impede the calculations, such as correlation, described elsewhere, although such correlations would rarely be perfect. Another embodiment allows management to assign a multi-level numerical rating to each item; management has the ability to take an item out of consideration when it chooses to, at which point management cannot change its rating of an item. Up until then, management can update its opinion based on continued user input in the discussion group, which would cause accuracy calculations to be re-executed.

This methodology for getting suggestions is very attractive for businesses because it rewards, not only the person who made a suggestion, but also those who helped to bring it to management's attention and argue for its importance by rating the suggestion highly and having an ongoing discussion about it. Note some embodiments enact this methodology in the message board context where any message can contain a suggestion tagged a suggestion and thus enter the process of being judged by management, whereas other messages, which may be discussions about suggestions rather than suggestions themselves, are rated and the accuracy of those ratings is determined as for regular message boards, discussed elsewhere in this document.

In preferred embodiments based upon this methodology, a notice is presented via the user interface to the effect that only the most early item containing a particular suggestion will be rated by management as good. That is, if two people present different messages each containing, in effect, the same suggestion, only the first one can be rated as good by management. This means that the second person who likes a particular idea is motivated to try to improve his ranking by rating the original message highly rather than by submitting his own item and rating it highly.

Most such embodiments give extra credit to the originator of a suggestion, based on the management-supplied rating of the item which contains the suggestion. For instance, in one such embodiment, the average management rating for the suggestions made by each user is calculated, and through ranking against other users a number between 0 and 1 is generated, then this is multiplied by the accuracy, timeliness and volume numbers generated as described elsewhere to determine the overall value of the contributions of the user. This overall value is then used to determine whether the user is among the top few who receive a monetary or product reward. In additional benefit to this methodology is that people who make suggestions will be motivated to do their own filtering, since they will be penalized for making poor suggestions.

In preferred embodiments of the methodology discussed in the previous few paragraphs, the sponsoring company's record is displayed. This information includes the amount of monetary award and/or number and models of products awarded; the time period in which the awards were granted, and the promises being made about future awards. This enables consumers to decide if it is worth there while to contribute their effort to the system.

It should be noted that various ways of interacting with the user are implemented in various embodiments. In today's technology, a particularly convenient set of embodiments is based on the user interface and networking elements of the World Wide Web. Other embodiments are based on such technologies as interactive TV, kiosks, and input and output over the telephone by voice and touch tones.

The techniques mentioned in this summary are not intended to be exhaustive, but rather to point to various examples of ways of implementing the overall concepts. Other examples are found in the details section. Other examples are not mentioned, but equally come within the scope of the invention.

Example Embodiment 1

Improving Online Community Through Ratings

There is a lot of "noise" in most Internet discussions in open forums. Many, people tend to simply state their prejudices with varying levels of vociferousness. There are also a large number of very thoughtful, valuable messages. As someone who has used online facilities both to get information and (in an earlier lifetime when I had time!) for conversation, I would really like some way of distinguishing the messages that are likely to be meaningful ("signal", in the jargon) from the messages that are likely to be "noise". I would like to increase the signal-to-noise ratio for my online discussion time. I want to read thoughtful messages that will really engage me—whether I agree with the ultimate conclusions of the author or not. Either way, I benefit, as long as the thoughtfulness is there. (In fact, I am likely to learn more by reading messages I disagree with, since the author is less likely to simply be stating things I already know!)

Several of attempts have been made to accomplish this through asking users to rate the messages they read, for instance, on a 5-point scale from "poor" to "excellent". For instance, the original business model behind Athenium, L.L.C. was to create NewsVillage, a Web-based overlay on the Usenet, that allowed people to rate Usenet messages and then read only the ones with the highest average rating. Other attempts include GroupLens, the Usenet-rating project begun at the University Minnesota that ultimately led to the company Net Perceptions, which supplies collaborative filtering technology for recommending music, books, etc and is now the recommendation engine at Amazon.com.

These experiments in message-rating have never really panned out. They have never "caught on" to allow a service to grow to critical mass. I think the main reason for this is very simple: it takes effort to provide meaningful ratings. Especially if you read many messages a day, the added effort involved in rating each one is prohibitive to the point that people just don't do it because they don't get anything in return for doing so—except perhaps by being told that they are "helping the community". If a system forces people to rate a message before going on to the next one, they will, for the most part, enter random ratings or enter the same rating every time.

Anything that adds value to something usually requires work (there are exceptions, of course, but this is not one of them). In the "real world", if you do work to add value to a project, you are paid for that work. If you help to build a house, you are normally paid in a respected common currency for that effort. Sure, some people get their friends together to help them build a log cabin in the woods without any form of compensation other than the pleasure of being together, but it is unlikely, to say the least, that that is ever going to be the dominant model for home-building.

Clearly, knowing what people tend to write the most rewarding messages, and knowing what messages have been the most rewarding for the people who have read them so far, would be very valuable as a way of separating the signal from the noise and making one's limited time online more valuable. Ratings provides a means to acquire that information, but the raters have to be rewarded for their effort.

One company tried to do this by awarding a tiny fraction of a frequent-flier mile for each rating a user made for Usenet articles. I can no longer find that company on the Web, so I assume that effort didn't go anywhere. I believe the problem with that effort was that, for enough value to be added in cash dollars or advertising exposure that frequent-flyer miles could be bartered or purchased from the airlines, many, many ratings had to be given. Abstractly but, I believe, realistically, this is because of a "conversion exchange" in taking items of value in the "economy" of the Usenet and trying to convert them into items of value in the "real-world" economy. The conversion rate is extremely steep.

So we need a reward system that stays within the economy of the Usenet.

This economy recognizes several forms of value, for instance:

a) Respect. People want to be respected for their contributions.

b) Self-esteem. People want to feel good about their contributions, which is linked but not identical to winning the respect of others.

c) Receiving help. People want to be able to ask questions when they need some help or advice and receive generous and helpful answers.

d) Interaction. Some people don't care whether they get respect or not, they just want to interact. Some people actively create arguments online just for the interaction; hostile interaction can feel better than none.

e) The pleasure of self-expression.

All the above are driving values in the economy of online discussions.

Collectively, they are the "currency" of online discussions. To efficiently pay people back for their efforts, they should be repaid in that same currency.

We want to motivate people to provide meaningful ratings. To provide an efficient reward for their efforts, we need to pay them back in respect, self-esteem, help, and interaction.

My idea on how to do this is to calculate the value of each person's ratings, and to make a very public display of the value of people's contributions in this sphere.

People can obviously contribute to the system by providing meaningful messages

They are repaid for their efforts by the respect they receive, the fun of interacting with people's responses, etc. I have also learned in my years of participating online that people who are respected members of an online community tend to receive help, when they need it, much more reliably and quickly than people with no reputations in those communities.

For those reasons, people do actively contribute messages to online communities.

Now, suppose they received those same rewards for posting meaningful ratings. Then people would be motivated for creating meaningful ratings similarly to how they are presently motivated to create messages—and this implies that meaningful ratings would be happily created.

Assume, for now, that we know how to compute the value of ratings (a technique will be specified using a Bayesian approach later in this write-up).

Suppose we post a list of users in order of the value of their ratings. In our online system, we make this list a very visible aspect of the system. We use all the marketing know-how we can muster to communicate the TRUTHFUL AND ACCURATE idea that ratings are as valuable to the system as messages are, because if one has limited time and doesn't know which messages are the most worth reading, and therefore misses out on those best messages, they might as well not have been written at all. Ratings plus messages add up to a highly rewarding experience; one without the other is less valuable. Meaningful ratings are therefore to be respected to a comparable (if not identical) degree to meaningful messages.

Let's look at how this can be used to reward ratings contributors in the currencies of online communities.

a) Respect. The top ratings contributors can win real respect on the system through the public display of their names (logon ID's, or whatever identifier makes sense). This is similar to electronic arcade games, where, although you may not see the top players actually playing, their initials are stored in the system's memory, and the high scores and the player's initials are displayed between games.

b) Self-esteem. Obviously, people who rank above-average in contributing to the system through their ratings have earned the right feel good about that.

c) Receiving help. In a system incorporating this idea, each person's postings to the discussion boards would include their level of contribution to the system in a highly visible placement. So even people who have not contributed at all in the form of useful messages, but who have provided meaningful value to the system in the form of ratings, will be the recipient of appreciation and therefore help from others. This "level of contribution" does not need to distinguish between the value they have added by means of ratings vs. the value they have added by means of highly-regarded messages (which should also be a factor in computing the level). This reinforces the idea that the value created by ratings or messages are fungible. As an extreme example of the importance of being a valued member of an online community, I once told a friend of mine who needed help with his computer to log onto a forum on Compuserve in which I happened to be well-known and to ask his questions there. Over time, I had reached the point that just about any question I asked received a quick and helpful response. But my friend was unknown to that community. When he logged on, he got no response at all to several questions. He came to the conclusion that online communities didn't work for him, gave up, and never went back.

d) Interaction. People who are known as contributors to the community are more likely to receive rewarding interaction with regard to messages they post.

e) The pleasure of self-expression. People love to give their opinions on things. This pleasure has been present in previous attempts to motivate people to give ratings to messages in online discussions; now it is supplemented and perhaps overshadowed by the other forms of currency mentioned here.

Because the system motivates ratings in the above ways, it will receive the ratings that will enable people to avoid reading worthless messages, and to focus their attention on the valuable ones, thus making their time spent in online discussions considerably more valuable.

NOTE 1.

If the intent is to produce recommendations for the community as a whole it is important that ratings not be based primarily on agreement or disagreement with the ideas expressed, but on their thoughtfulness and/or entertainment value. Of course, agreement will never disappear as a criterion for ratings, but appropriate wording in explanations and instructions in the system can stress the idea that thoughtfulness and entertainment are the criteria.

NOTE 2. Not addressed in this write-up is the fact that ratings can also be used to derive a profile of the rater's interests, which can in turn be used to compute the expectation of the value he, as an individual with his own tastes and interests, would give in rating messages he hasn't read yet. These expectations can be presented as the priority with which he should read the various messages in the discussion, which would be different to the priorities presented to someone with different interests and tastes.

NOTE 3. Ratings Input.

We want to minimize the degree of effort needed to create ratings. So, the most common case should take no effort at all.

One solution to this involves a ratings mechanism based on a pair of "radio buttons". (Radio buttons are user-interface features, usually a collection of small, circular, clickable buttons, which allow none of the buttons to be in the "on" state or one of them to be in the on state, but not more than that.) One radio button is labeled, "Less thoughtful and entertaining than average". The other is labeled, "More thoughtful or entertaining than average". Picking neither button means abstaining NOTE 4. Computing the Value of Ratings.

First, we have to decide on what we mean when we say a rating is valuable to a community.

We will say a rating is "valuable" to a community if it is representative of the opinion of that community. That is, if most people in a community will particularly value a given message, a representative rating is one that indicates that the message has above-average value.

Note that within a particular discussion area, the overall community can be broken into sub-communities of people who have similar tastes and interests which might be different from those of the overall community. All the analysis discussed here can occur at either the level of the community as a whole or any of sub-community of like-minded people (see Note 2, above), so this system can be used to give either customized recommendations of messages or general recommendations of articles to the whole community.

Representativeness is a powerful measure of the value of a rating simply because the purpose of the ratings is to be able to predict the community opinion from a small number of votes, so that people can prioritize the order in which they read messages for maximum expected benefit. A rating must be representative of a community's opinion in order to usefully guide that community.

There are varying degrees of statistical sophistication that can be used to compute the value of a user's ratings. I will now describe one very simple approach which is rooted in Bayesian statistics.

This takes two steps. First, we calculated the "expected rating" of each message. The we calculate an "expected value" of each user's ratings.

Expected Rating of Messages:

Some users who won't care about giving ratings. Using the input mechanism of Note 3, such users will abstain. We will only consider the actual votes.

Using the method of Note 3, votes are divided into "Less thoughtful and entertaining than average" and "More thoughtful and entertaining than average". We will assign a value of 1 to "more" votes and a value of 0 to "less" votes. Let p be the ratio of "more" votes to the total number of votes in the system as a whole, considering all messages. Using a Bayesian analysis based on the beta distribution, the expected rating for a message which has accumulated N actual ratings from users is (pw+m)/(w+N) where m is the number of people who voted that the messages was more thoughtful than average and w is a parameter that is adjusted for best performance as more data comes in from the field (it can start at 1).

This means that when nobody has voted on a particular message, its expected rating is p (for instance, if the system is equally divided between "less" and "more" votes, the expected rating for a particular message which has no votes yet is 0.5). But as votes come in, the expected rating moves in one direction or the other according to the proportion of "less" to "more" votes. For instance, if every vote regarding a particular message is a "more", the expected rating asymptotically approaches 1 (ever-increasing belief that the next vote will be 1).

Expected Value of a User's Ratings

We will take a very simple approach here for illustrative purposes. More accurate approaches can be built, but as the amount of data grows, their advantages over this very simple approach becomes less and less.

We have already noted that a rating is "representative" if it agrees with the majority of people who have made the effort to vote on the message in question We will assign a value of 1 to a representative vote, and a value of 0 to a non-representative vote.

Let p be the proportion of votes that are representative in the system as a whole. Then, again using a Bayesian analysis based on the beta distribution, we compute the expected representativeness of a user's ratings as (pw+r)/(w+N) where N is the number of votes, r is the number of the user's representative votes, w is chosen by the system to optimize performance but is initialized at 1.

(Note: by optimizing performance, we mean picking a value that most maximizes the accuracy of the formula in predicting behavior; this can be easily done using known optimization techniques once there is a meaningful amount of data.)

This expected representativeness can be thought of as the expected "value to the system" of the user's ratings.

Then, to measure the user's overall contribution to the system, we can multiply the expected value of his ratings by the number of his ratings. Users who contribute a large number of valuable (representative) ratings are rewarded with a high profile on the contributor's list and impressive contribution rankings on all their messages.

This analysis of measuring the representativeness of a user's ratings has one major limitation, however. It doesn't take into account the fact that a rating has much more value if it is the first rating on an item than if it is the $100^{th}$. The first rating will provide real guidance to all who see the message after that; the $100^{th}$ rating will not change people's actions in a major way. Also, later raters might choose to simply copy earlier raters.

Therefore, we want to weight earlier ratings more than later ones. The question is, how much more valuable is the $1^{st}$ rating than the second one, and the $2^{nd}$ one more than the $3^{rd}$, etc.?

A reasonable methodology when a small amount of data is available is to use a cumulative exponential distribution to model this weight. Taking this approach, we calculate the expected value of a user's ratings as follows:

$$\text{Let } f(r) = \begin{cases} 0, & \text{rating } r \text{ is a hit} \\ 1, & \text{rating } r \text{ is a miss,} \end{cases}$$

let R be the collection of all the user's ratings, let c(r) be a natural number representing the count of ratings other users had assigned to r before the user in question assigned his, and let $$g(r) = e^{-\lambda c(r)}$$

where λ is a chosen parameter of the exponential distribution. A reasonable value for λ would be chosen such that g(r)=0.5 when c(r)=1; in other words, the value of a message's first rating is twice as much as the value of its second rating.

Then the expected value v of a user's ratings is $$v = \frac{pw + \sum_{r \in R} g(r) f(r)}{w + \sum_{r \in R} g(r)}.$$

Then the performance of the system can be tuned, once real-world data is obtained, by using standard computer optimization techniques such as simulated annealing or genetic algorithms to find optimal values for w and λ.

The exponential distribution is not necessarily the best possible basis for calculating g(r). It is not an aim of the present invention to find the optimal calculation technique for g(r). Koza's genetic programming technique can be used, another optimization method may be used, or a genetic algorithm technique such as the one discussed in U.S. Pat. No. 5,884,282 for evolving a monotonic function based on a 49-bit chromosome.

Example Embodiment 2

[This example is written in the informal language of a company's internal concept paper.]

Introduction

This write-up describes a technical and business model with the potential to generate reusable knowledge and organize it in an accessible manner. The knowledge is thus available for retrieval on a when-needed basis. The system has some properties that may enable it to attain exponential growth if used in a public setting, leading to a high valuation for the company.

For the purpose of this write-up I will be referring to it by the brief handle "Kgen".

Ratings and Value-Proportionate Compensation

Knowledge Donation, Knowledge Valuation, Knowledge Organization, and Full Coverage are all Similarly Important.

The Usenet, for example, receives many thousands of units of knowledge donation per day (in the form of individual articles). These are of varying value. DejaNews allows the user to retrieve these articles based on keywords. In other words, DejaNews allows the user to retrieve relevant knowledge. But it is very inefficient at enabling useful research to be done, because most of the knowledge on the Usenet has little or no value, and DejaNews provides no way to tell which is which.

It is important, in a truly effective knowledge system, to have a way to valuate the knowledge items. Knowledge can be valuated by means of ratings. This important point will be discussed in much depth later in this write-up.

Organization is also important. Knowledge is primarily organized on the Web in two ways:

Hierarchically. It is no accident that just about every product for which information is provided on the Web has a hierarchically organized FAQ associated with it for easy access to information. Hierarchical (or "outline") organization works well for this purpose, and has evolved to be a dominant form of knowledge organization on the Web.

Indexed. Search engines have the ability to automatically organize knowledge through enabling retrieval based on concepts (or, more primitively, keywords). However, it is a thesis of this write-up that such indexed retrieval could be facilitated by means of human input of appropriate keywords and weights. Indeed, historically, knowledge collections such as research articles have always had author-generated keywords associated with them. It is a thesis of this write-up that the fact that keywords for Internet-hosted articles tend to be automatically extracted does not mean that it is preferable to do so, but only that no motivational system has yet been created to motivate humans to supply keywords as an additional aid to indexing.

Organization in each of these ways (or ideally, both together), makes the knowledge easier to find and thus of more practical utility.

Another factor is full coverage of the subject area. This is important because if the goal is to generate a knowledge base that people will return to time and time again, they need to consistently be successful in finding the information they need there. If they fail to do so too often, they will be frustrated and spend too much time in fruitless searches, lowering the utility of the system as a whole.

Up to now, services on the Internet have focused on easy knowledge donation (for instance, the Usenet) combined with automatically indexed retrieval.

Without a powerful motivational system in place, this is probably the best that can be expected. Knowledge donation today occurs in the context of individuals having the pleasure of communicating with (and sometimes helping) each other. The knowledge is to a large degree a by-product and thus the "signal-to-noise" ratio is poor. Automatic indexing, which cannot distinguish between signal and noise, can retrieve the relevant knowledge, but not the valuable knowledge.

There is clearly much room for improvement to this state of affairs. What is needed is a motivational system that causes people to contribute low-noise knowledge in such a way that it is stored in a highly organized way for ease of retrieval. Further, a system that encourages full coverage would have a further advantage.

Valuation is the Key to Providing a Motivational System

In order to create a motivational system governed by something other than social feelings and altruism, people needed to be compensated for their work.

Contributing content (knowledge) is work.

Participating in organizing it is work.

But, in order for compensation to be used effectively enough to be useful, it must go where due. Content that is pure noise cannot be compensated equally to content that is very valuable. First of all, in that case, there won't be enough compensation to go around. The system could give every item the same extremely low compensation as a way of conserving compensation-resources, but such low compensation won't be enough to motivate the creation of highly valuable individual items. Moreover, people can get the same reward for less work by creating worthless content. In fact, an equal rewards system motivates the lowest level of quality that the system will award compensation for; anything else would be a waste of time and energy on the part of the person doing the work.

(Note that in the above paragraph we are ignoring such factors as the feeling of doing a job well and peer pressure. However, these factors are not enough to generally obviate the need for proportionate compensation in the real world, and there is no evidence to lead us to believe that the knowledge-generation world will be significantly different in this respect.)

So, compensation should be proportional to value.

Any currency-based economy is an example of this. One doesn't pay the same amount of money for any object no matter what it is. A marble costs less than a Ford Escort, and a Ford Escort costs less than a battleship. In fact, the graduations are very fine; an "average" marble costs less than a "fancy" marble. All economies have evolved this way because it enables them to work more efficiently and effectively. It is a universal principle.

Kgen needs to embody this same universal principle: compensation proportionate to value.

In Order to Compensate Proportionally to Value, Value Must be Measured. Ratings Provide a Means to do this.

Ratings are a simple way for value to be determined. From movie ratings provided by professional reviewers to product ratings provided by Consumer Reports, ratings are ubiquitous and a simple way to communicate valuations.

However, Ratings are Another Form of Work. to Motivate Non-Random, Meaningful Ratings, Value-Proportionate Compensation Must be Provided.

One attempt to provide compensation for ratings is an apparently defunct Web site that requested ratings of Usenet postings in exchange for frequent-flyer miles.

This is an example of a violation of the "compensation proportionate to value" principle. The site apparently did not work well enough to stay around. One possible reason for this is this compensation principle—the site gave users no motivation to donate meaningful ratings—it only provided users motivation to randomly click one of the ratings buttons.

Without meaningful ratings, we don't know the value of the donated knowledge items or effort in creating organization. Without valuations, we can't compensate properly, and can't expect to have an efficient, effective motivational system.

(Note: There are other potential sources of valuation, such as observing the amount of time spent reading a given item. Indeed, it may turn out that such passive valuation turns out to be a good adjunct to ratings. However, there is no known example where passive valuation has been an effective engine for large-scale valuation of knowledge. Some of its limitations are obvious. For instance, consider the case of assuming value is proportionate to the time spent reading an article. The user may go to the bathroom while reading an article. Or, it may be that one article very concisely communicates valuable information and so can be read in a short time, while an alternative article on the same subject is confusing and rambling and takes much longer to acquire the same information—in which case the first article would be more time-efficient and hence have more utility. There may turn out to be a use for such passive valuation sources, but at present there is no reason to assume that they can be the primary source of valuations in an effective knowledge generation system.)

We need meaningful ratings. Meaningful ratings are work. Work won't be done without compensation. Compensation must be proportionate to value.

So We Need a Way of Measuring the Value of Ratings

Rating the ratings themselves is obviously an endless conundrum. Another solution is needed.

Such a solution is available. The general principle is that people who are providing meaningful ratings tend to agree with each other and to vary their ratings from item to item, whereas people who don't tend to provide ratings that are random (or, equivalently, constant). This will be described in more depth later in this write-up. We will refer to this solution as "expert convergence".

By providing a means to estimate the value of ratings, we can compensate users for providing meaningful ones, thus providing the necessary foundation for effective knowledge generation.

The Forms of Compensation

We have established that the heart of the knowledge-generation system is value-proportionate compensation. The value of the contributed knowledge and organizational effort is determined through ratings. The value of the ratings is determined through expert convergence. So we know how everything is valued.

The remaining question is: how do we provide compensation?

There is more than one form of compensation available to us:

Revenue Sharing

The Mining Company has pioneered the concept of sharing advertising revenues with the people who are community managers for various subject areas. There are hundreds of such managers. However their compensation is typically low (in the hundreds of dollars per month) as there is not at this time a huge audience to for any one community that can give a real income. However, revenue sharing is nevertheless one viable component of a compensation package.

Public Reputation: Respect of Peers

Public reputation has always been a major motivator in many areas. People who play video games try to get their initials onto the lists of the highest-ever scorers that are typically stored in each machine and displayed at the end of each game.

Authors and musicians are partly motivated in their efforts by their public reputations. The same is true for businesspeople within the community of their businesses.

Another manifestation of this, and one more to-the-point in some ways, is the valuable work being done in the open-source software community on large and successful projects, best exemplified by Linux. Linux is universally reputed to be more solid and stable than Windows NT, despite the fact that no money is paid to Linux developers and NT developers and quite highly paid, including stock options that have made millionaires of many Microsoft employees. Open-source developers become known for the quality of their work within the open-source community. Since there is no financial compensation, one can reasonably assume that this reputation is one significant factor in motivating this high-quality work.

We can provide visible public reputations to our users. These will take two forms. One is a top-scorer screen, similar to those used in video games. The other is a database from which the score of any user can be seen. Scores will be based upon the value they add to the system.

Typically, two scores will be presented: the amount of value the user has added over time, and the average value per effort donated (whether a rating, article, organizational effort, etc.)

It is expected that these scores will be presented in terms of percentile ranks within the overall community as such ranks will be more readily understood than other methods.

Such examples as Linux seem indicative of the outcome that a large-scale knowledge base can be largely motivated through enabling people to earn the respect of their peers through contributing to the system.

Public Reputation: Earning the Informal Right to Receive Assistance.

As a general principle, I have often observed that "newbies" an online community typically get slower and fewer responses to questions, if they receive any at all, than people who contribute often and therefore have reputations for being a valuable member. People want to help people who are themselves helpers.

One problem with this way of deciding who to help and who not to help is that a person may be a major contributor in other subject areas, and now be in need of help in an unfamiliar one. Since he hasn't been in that area often, he is unknown to that community, and therefore thought of as a freeloader—even though he may be very valuable to the larger community.

Our scoring system solves that problem by providing overall percentile rankings for each person which persist as they move from subject area to subject area. The value a user adds in his area of expertise will mark him as a valuable contributor.

The community aspects of Kgen will be described below. The point being made here is that by earning a reputation for contributing to the system, one will earn a higher probability of receiving human assistance when needed in the context of those communities.

Public Reputation: Support for Independent Income.

All over the word, there are experts that can help with a given problem you or I may have at a given moment. It may be a business management question, a programming question, a recommendation for a home appliance, etc. It could be any of thousands of things.

The problem is that we don't know where to go to find someone who is immediately available to help us and who we can trust to do a good job. If we had a way of finding someone with the appropriate knowledge, and they had a reputation that enabled us to trust that they could help us, in many cases we would be happy to pay an appropriate fee for their services.

Kgen's public reputations provide a basis for this trust. Someone who is highly-ranked within the knowledge area he contributes to is someone who is likely to be superior at supplying assistance within that subject area.

So, by supplying contact information for the contributors, we help empower them to earn money in exchange for their proven skill. They are enabled to do so because of the quality of their work in adding value to the system through one or more of the possible forms of contribution.

Public Reputation: Personal Pride

Regardless of practical uses for public reputation, people are also highly motivated by factors of pride and self-esteem. Many people are highly motivated by finding ways to experience themselves as good at something. In this case, the additional factor of being good at something that is contributing to a community makes scoring highly within Kgen even more meaningful as a source of pride.

There are people who spend hours a week as unpaid co-moderators at AOL, who are given an "official," public status at AOL—so much so that the question has recently come up as to whether they should be considered to be actual employees of AOL. One can guess that a major factor in motivating this work is the pride of being a leader in the community.

It is expected that similar factors of pride will motivate many people to want to earn their stripes as contributors to what can become the greatest single accumulation of immediately useful knowledge in the world.

Again, there can be no doubt that similar motivations can be found among the contributors to Linux. They also want to contribute to something large that will be a real force in the world. That project has succeeded, and it seems quite reasonable to postulate that this one will too.

Public Reputation: Summary

It is a thesis of this write-up that these various forms of public reputation will be a meaningful factor in motivating people to contribute knowledge, organization, and ratings to the system. The main benefit of these forms of compensation are that they cost us nothing.

Other Compensation

There is no reason that we can't look towards other compensation mechanisms such as frequent flyer miles as well. These compensation mechanisms would all be tied to the quality of the donated work.

Structure of a Public Service

Some embodiments are primarily structured as an FAQ. FAQ's have evolved over time to be a dominant form of easily-accessible knowledge on the Web. As noted above, virtually every manufacturer with a Web presence has an FAQ describing their product.

Large FAQ's are hierarchical in nature. They are broken into various subject areas. To find the answer to a given question, the user works his way through the hierarchy to find the answer he wants.

At the same time, most sites index everything with their search engines, so the FAQ entries are available through keyword and concept searches, too. Recent technology such as Apple's Sherlock and Ask Jeeves enable natural language searches; over time we should be able to add such technology, either through strategic partnerships or technology purchases.

Forms of Contribution

Knowledge items (FAQ entries). Users can write questions and answers that they think will be useful to the community. These Q&A's will be considered to be "knowledge items." Users can also write alternative answers to existing questions. Perhaps they can additionally write questions without answers (this needs more thought) in the expectation that somebody will write a question.

Suggestions. If a user believes an item is in the wrong place in the hierarchy, he can make a suggestion that it be moved to another location (each location will be marked through a numbering system). Easy access will be provided so a user can visit the suggested location to see whether they think it is suitable. Similarly, a user can make a suggestion that a Q&A be dropped due to being redundant. When a suggestion has received enough positive ratings that it is statistically measured to be highly likely to be worthwhile, the system will automatically carry it out. This can involve moving or deleting an item, or perhaps other acts as the system evolves.

In addition suggestions for improving an item will inevitably turn up in the discussion forums associated with that item.

Ratings. Users can rate knowledge items and suggestions. Ratings of each type of contribution are considered to be of value.

Public Reputation

Each user's ID will be displayed on each of the knowledge items he contributes. The ID will be clickable and take the user to a page displaying the accumulated reputation of the user. His percentile rank for quality and frequency of contributions will be displayed.

A reason not to break these items out is that everyone realizes that writing knowledge items is a valuable form of contribution. To date, there is no precedent for the public valuing of ratings. In order to stress the fact that all forms of contribution are valuable and worthy of esteem, it may be advisable to not separate them in the display.

There will also be means to access a user's scores through an interface that allows an ID to be typed in and the score retrieved. Finally, as we add lists of people who want to help others to each subject area, the scores will be available through that list.

A Learning-Oriented FAQ

We will redefine the FAQ, for the purposes of this section, as Learning Items (LI's) and start to define a different way of looking at things.

When students study from a textbook, they frequently have questions about specific things appearing in the book.

LI's could work in conjunction with existing course materials such as a textbook. An LI would explain something that was perceived to be not as clear as possible. The reference section on an Enter LI screen would contain the page and/or section and/or paragraph number that was being explicated.

The idea would be to generate a database that would make it easier to understand the course material.

During the Enter LI phase, the team would work together. Students would each be required to create one LI. However, they are also in the process of studying, and will have questions. So, on the team discussion page and/or by chat or other means, they can ask questions of their teammates when they don't understand something.

These questions can then become fodder for someone to write an LI.

So, the process of give-and-take during the Author LI phase is providing a forum where students can help each other understand the material at the same time as they are working towards creating their individual LI's, and helping each other with that goal.

As in the case of FAQ Q&A's, each LI will eventually be rated by the other team according to how much value it adds:

Does it add value by explaining something that was harder to understand in the original text?

Does it do so better than other LI's on the same question?

Overtime, the database of LI's for a particular set of learning materials will become so complete that it would be hard to create a valuable new LI.

In that case, as was suggested above, we can randomly delete some of them. However, in this context, there is no problem associated with it, because LI's are not general-purpose just-in-time problem-solving FAQ entries that really should be available to the company as a whole. They are just for the purpose of learning, and may only be available to the students taking the course (or who already took the course). So there is no problem in removing some of them—there is no outside database to compare to see what's missing.

Of course, all LI's for previous rounds can be available to students or the course through View Results.

Also, if the instructor chose to use other basic course materials at another time, there is no reason why all previous LI's could not be displayed.

Also, people who already took a course could log on to the system at any time to refresh their memory about something. So we would be creating a useful knowledge repository, just as in the FAQ model, but a user would have to take the course to get access to it.

There is still a problem of cooperative cheating, where, for example, students taking a course at one time copy the LI's and store them somewhere where they are available to students taking the course later. A similar problem exists with the SAT's, but security measures make it very difficult to copy an SAT. These are issues to discuss.

One final point is that it can be imagined that through more elaborate structuring tools, an entire course materials set could possibly be evolved in this way, which could ultimately replace the need for outside course materials.

Structure of the Best-Practice Mining System

Use of the Kgen process for brainstorming and the mining of best-practices is similar to the learning model, except that study materials may be unnecessary.

The ratings processing allows the system to determine which practices are likely to actually be "best" since rating quality ultimately depends on the expertise of the rater. Rather than giving everyone an equal vote about which practices are of value, including those people who will simply pick the most obviously correct practices, or who vote randomly, Kgen gives the most votes to the ratings most likely to be meaningful. Thus Kgen's discernment is greater than that of a one-vote-per-person system.

Technical Issues

Measuring the Quality of Ratings

I will present a technique for doing this here. I call this technique "expert convergence." However, I want to stress that it is very likely that more efficient techniques will be found once we start serious work in this.

The calculated quality of a rating is really a statistically-calculated expectation of the quality. There is no computational way to know the quality for certain.

Imagine that we have a knowledge item and a collection of n ratings for that rating, r1, r2, . . . , rn, on a 5-point rating scale.

Suppose we make guesses, g, about the real value of the item, and see how well that guess matches up to the actual ratings we have in hand.

First we guess ½ point, then 1 point, then 2 points, etc.

At each point we calculate the following number: a number between 0 and 1 representing the probabilistic unlikeliness that the as many of the ratings would have been as close as they are to g under the assumption that the ratings were simply randomly chosen by the users.

In the patents that have been issued in my name by the United States Patent Office, I have described detailed algorithms for accomplishing this. There are other ways, as well.

One of the points will be calculated to be more unlikely than any other.

We will use that point as our estimate of the "real" value of the item on the 5 point scale.

Some ratings will be close to this point and some will be far away. The ones closest to the point are the ones we assume have the most value, because they are the closest to the estimated real value of the item.

A useful measure of the value of the rating would be the distance from g calculated above (its p-value, in statistical language; "better" p-values are near 0; p-values are always between 0 and 1).

Measuring the Effectiveness of Raters

Effective raters tend to consistently give meaningful ratings.

Assume, for a given user, we have a collection of p-values calculated from his ratings of various knowledge items: p1, p2, . . . , pn.

Then a meaningful measure, m, of his effectiveness at consistently contributing meaningful ratings would be given as $(1-((1--p1)(1-p2) \ldots (1-pn))\hat{}(1/n)))$, where ^ is the power operator, for reasons that are beyond the scope of this write-up.

Also, under the assumption that his ratings are random, the likelihood of their being as consistently good as they are by chance alone can be computed based on the above calculation, resulting in another p-value. Thus we have a possible statistical measure of goodness when we want to find the users we are most confident will produce good ratings.

Another consideration is the fact that some ineffective raters will tend to always choose the same rating for each question. Thus, the variance of ratings provided by a user can be used as another way of refining our effectiveness measure. Variances can be converted to p-values, and combined through multiplication with the p-value determined above; using other techniques a new "combined" p-value can be calculated that incorporates both factors.

Measuring the Quality of Knowledge Items

In order to calculate the likely quality of a rating, described above, we made guesses about the actual value of the item, and chose one to be our estimate of the real value of the item. However, that was done in the context of trying to judge the worth of a rating, in order to judge the effectiveness of the rater.

Now that we have calculated the effectiveness of each rater, we can do a better job of guessing the actual value of the item. We can do this be using our knowledge about the rater to weight each rating.

For example, we can use (1−m), calculated above, as the weight of a rating generated by a user with measured effectiveness m. Alternatively, we can rank the raters according to m, and use the rank as the weight.

These weights can be used in calculating a weighted average of the ratings, which can be calculated arithmetically or geometrically.

My collaborative filtering experimentation has shown that all these approaches will "work", but some will work better than others. We can deploy or system using the simplest possible approach, and then try other approaches on the data we collect, and eventually deploy the calculation that works best for predicting the ratings of effective raters for given test items.

Finally it should be noted that iterative techniques are possible. When we originally calculated an item's best guess of the real value, in order to measure "expert convergence" for one item, we did so without incorporating any knowledge of the raters. After doing that, it would be possible to go back to the beginning of the calculations are recalculate the expert convergence by taking the weights into account. That would ultimately change (and improve) our measure of the effectiveness of each rater; we can repeat until convergence.

Rating-by-Rating User Valuation

This appendix discusses aspects of the invention that relate to certain mathematical calculations One problem being addressed is the fact that people can supply ratings that are essentially random (due to not making the effort to provide truly meaningful ratings), or which are consciously destructive or manipulative. For instance, it has been commented that on Amazon.com, every time a new book comes out, the first ratings and reviews are from the author's friends, which are then counteracted with contradictory reviews from his enemies.

The key to solving this problem is to weight each user's ratings according to their reliability. For instance, if the author's friends and enemies are providing ratings simply to satisfy personal needs to help or hurt the author, it would be helpful if those ratings carried a lower weight than those of other users who have a past reputation for responsible, accurate ratings.

A problem solved by this invention is to provide a way to calculate that past reputation.

This reputation can be thought of as the expected "value to the system" of the user's ratings. This is bound up with the degree to which the user's ratings are representative of the real opinions of the population, particularly the population of clusters which are more appreciative of the genre into which the particular artist's work fits.

(To measure the user's overall contribution to the system, we can multiply the expected value of his ratings by the number of his ratings. Users who contribute a large number of valuable [representative] ratings are, in some embodiments, rewarded with a high profile such as presence on a list of people who are especially reliable raters.)

One can measure the representativeness of a user's ratings by calculating the correlation between those ratings and the average ratings of the larger population.

This analysis of measuring the representativeness of a user's ratings has s major limitation, however. It doesn't take into account the fact that a rating has much more value if it is the first rating on an item than if it is the $100^{th}$. The first rating will provide real guidance to those who are wondering whether to download or buy a recording before other ratings have been entered; the $100^{th}$ rating will not change people's actions in a major way. So early ratings add much more actual value to the community. Also, later raters might choose to simply copy earlier raters, so they can mislead any correlation calculations that way.

Therefore, we want to weight earlier ratings more than later ones. The question is, how much more valuable is the $1^{st}$ rating than the second one, and the $2^{nd}$ one more than the $3^{rd}$, etc.?

Let S be the set of all items; let N be the number of all items; for s∈S and 0<i≦N, $s_i$ is the i th item. Let u be the user whose rating representativeness we wish to compute.

Let $g_{i,u}$ be the number of ratings received by $s_i$ previous to u's rating. (i.e., if u gives the first rating for item $s_i$, $g_{i,u}$ is 0.) Let $t_i$ be the total number or ratings for the i th item.

Let $r_{i,u}$ be u's rating of the i th item, normalized to the unit interval. Let $a_i$ be the average of the ratings for the ith item other than u's, also normalized to the unit interval.

Let $\lambda_1$ and $\lambda_2$ be constants. Let $q_u$ be the representativeness of U's ratings, calculated as follows:

$$q_u = \frac{\sum_{i=1}^{N} e^{-\lambda_1 g_{i,u}}(1 - e^{-\lambda_2 t_i})|a_i - r_{i,u}|}{\sum_{i=1}^{N} e^{-\lambda_1 g_{i,u}}(1 - e^{-\lambda_2 t_i})}.$$

Then $q_u$ is a number on the unit interval which is close to 1 if the v's ratings have tended to be predictive of those of the community as a whole, and 0 if not.

$\lambda_1$ and $\lambda_2$ are tuned for performance. $\lambda_1$ is a parameter of the cumulative exponential distribution determining the rate of "drop-off" associated with the importance of a rating as more ratings for a given item precede v's rating. $\lambda_2$ is a parameter of the cumulative exponential distribution determining the rate at which the drop-off is associated with the number of total ratings. For instance, if there are no ratings for an item other than v's, the rating has no importance in calculating representativeness and is therefore given weight 0. These parameters can be set manually by intuitive understanding of the effect they have on the calculation. In some embodiments they are set by setting up a training situation in which a number of users rate the items without the means to see other people's ratings; furthermore, these users are selected and given financial or other motivation for putting the effort in to input the most accurate ratings they can generate. These controlled ratings are averaged. Then standard computer optimization techniques such as simulated annealing or genetic algorithms are used to determine values for $\lambda_1$ and $\lambda_2$ that optimize the correlation between these averages and $q_u$. $q_u$ is calculated using the entire population of users in usual viewing mode (such that they could see the ratings of other users). In preferred embodiments, tuning activities are carried out within the memberships of individual clusters. That is, the controlled ratings given by members of a cluster are used to tune the parameters relative to the general ratings given by other members of the same cluster. This is carried out for each cluster. If it is deemed that there aren't enough members of some clusters to effectively tune the parameters separately for each cluster, then in such cases the values for $\lambda_1$ and $\lambda_2$ are averaged across all clusters, and clusters without enough members can use those averaged values. In addition, if a given user has created ratings in multiple clusters, some embodiments simply use the average of his representativeness numbers for all clusters as his single viewable representativeness and some clusters display separate representativeness numbers depending on the cluster in which the numbers are being viewed.

The representativeness of a user is then used for various purposes in various embodiments. In some embodiments, it is presented to artists as a reason to pay a particular user to providing ratings and reviews for new items. In further embodiments, it is used as a weight for the user's ratings when calculating overall average ratings for an item. In some embodiments, listings are provided showing the users' rankings as trustworthy raters, giving "ego gratification"; in must such embodiments these numbers are also available when viewing the user's profile, along with other information presented about the user.

It should not be construed that this invention is dependent upon the particular calculation method for representativeness which is described above.

For example, another embodiment uses the following algorithm for computing the representativeness $q_u$ of user u:

Calculate the average rating for each item, not counting u's rating. For each item, rank the population of ratings in order of their distance from the average rating. In embodiments where discrete ratings are used (that is, some small number of rating levels such as "Excellent" to "Poor" rather than a continuous scale), there will be ties. Simply give each rating a random rank to eliminate ties. For instance, if the average rating is 3, and the ratings in order of their distance from the average are, 3, 3, 4, 2, 5, 5, 1, then after randomization one of the 3's, randomly chosen, will have the top rank, the other will have the next highest rank, the 4 will have the third highest rank, etc.

Call the distance from the average, based on these ranks, the "discrete closeness." Label the ranks such that the closest rating has rank 0, the next closest 1, etc., up to N−1, where N is the total number of ratings of the item. Now pick a random number on the interval (0,1]. Add it to the discrete closeness, and divide the sum by N. Call this quantity the "real closeness" of user u to the average for the ith item and label it $p_{i,u}$. If user u's ratings are randomly distributed with respect to the average rating for each item, then the population of $p_{i,u}$'s has a uniform distribution on the unit interval. It can be shown that, due to this, the quantity $$x_u = -2 \sum_{i=1}^{N} \log(1 - p_{i,u})$$

has chi-square distribution with 2N degrees of freedom. A chi-square table can then be used to lookup a p-value, $p'_u$, relative to a given value of $x_u$. The quantity $p_u = 1 - p'_u$ is also a p-value and has a very useful meaning. It approaches 0 when the distance between u's ratings and the averages are consistently close to 0, "consistently" being the key word. Also, as N increases, $p_u$ becomes still closer to 0. It represents the confidence with which we can reject the "null hypothesis" that u's ratings do not have an unusual tendency to agree with the average of the community. So $p_u$ is an excellent indicator of the confidence we should have that user u consistently agrees with the ultimate judgement of the community (in most embodiments, this is the community within a taste cluster).

Preferred embodiments using the chi-square approach also include weights relative to how early u was in rating each item and to take into account the number of ratings for each item. Let $w_{i,u} = e^{-\lambda_1 g_{i,u}}(1 - e^{-\lambda_2 t_i})$, where $g_{i,u}$ and $t_i$ are defined as before. Let $$y_u = \prod_{i=1}^{N} p_{i,u}^{w_{i,u}}.$$

Then $$p'_u = Prob\{y_u \leq b\} = \sum_{i=1}^{N} \frac{b^{\frac{1}{w_{i,u}}}}{d_i},$$

where $$d_i = \frac{(w_{i,u} - w_1)(w_{i,u} - w_2) \ldots (w_{i,u} - w_{i-1})(w_{i,u} - w_{i+1}) \ldots (w_{i,u} - w_N)}{w_{i,u}^{N-1}}$$

We use $p_u = 1 - p'_u$ as the measure of representativeness, with numbers closer to 0 being better, as before.

Finally further embodiments provide weights for one or both of the terms in the expression for $w_{i,u}$. Proper weights can be found using the same procedures as are used for finding $\lambda_1$ and $\lambda_2$; using genetic algorithms and other optimization techniques, in some embodiments all these weights are found at the same time.

In general, in various preferred embodiments of the invention, various algorithms that allow a representativeness number to be calculated which includes the predictive nature of the user's ratings are used, so the invention as a whole has no dependency on any particular method.

When displaying the quantities calculated as the representativeness numbers, preferred embodiments calculate rankings of the various users with respect to those numbers, or percentile rankings, or some other simplifying number, since the representativeness numbers themselves are not intuitively comprehensible to most users.

Another useful feature emerges if we take $g_{i,u}$ to be a measure of elapsed time in days between the public release of an item and the time the user rated it (which can be 0 if the review preceded or coincided with the public release), and $\lambda_2 = \infty$. Then the approaches mentioned above for calculating representativeness can be extended to such situations as measuring the value of a user in predicting the overall long-term sales of particular items (or even to predicting stock market prices and movements and other similar applications).

For instance, in some embodiments, a correspondence is made between ratings and ultimate sales volumes. In one such embodiment, the following algorithm is executed. For each rating level, all items with that average rating (when rounded) are located which have been on sale for a year or longer. Then, within each cluster, average sales volumes for each rating level's items are calculated. Then this correspondence is used to assign "sales ratings" to each item based on the total sales of that particular item; the actual sales are matched to the closest of the rating-associated levels of average sales, and the corresponding rating is used as the sales rating. (If there hasn't yet been enough activity in a particular cluster to conduct this exercise meaningfully, system-wide averages are used.)

In this embodiment $p_{i,u}$ is computed using rankings of distances from the sales rating rather than from the average rating. Then $\lambda_2$ is set to $\infty$ (in other words, the $(1 - e^{-\lambda_2 t_i})$ term is set to 1). Then we calculate the representativeness, $p_u$, as before.

As with the case of calculating representativeness with respect to general ratings, it should not be construed that this invention is dependent upon the specific calculations given here for calculating a user's ratings' representativeness with respect to sales; other calculations which accept equivalent information, including the user's ratings, the sales volumes, and time data for ratings and sales (or, equivalently, elapsed time data), outputting a representativeness which involves a predictive component, will also serve the purpose of providing equivalent means for use by the invention overall.

For instance, in some embodiments, a rank-based technique is used for calculating representativeness. In one such embodiment, time data is used to determine the items that the user rated soon after their release (or at or before their release) and that have now been on the market long enough to meaningfully measure sales volumes. These items are used to perform Spearman rank correlation between the user's ratings and general ratings or sales volume; other items are ignored. Other embodiments perform rank correlation based on this restricted sample and separately perform rank correlation upon all items rated by the user, and perform a weighted average on the results.

Note 1: In some embodiments, it is possible for a user to change his review and rating of an item over time, since he may come to feel differently about it with more experience. But for purposes of calculating, his earlier ratings are stored. In preferred such iterations, the last rating of an item entered on the first day that he rated that item is used.

Note 2: In cases where the cluster has too few ratings or sales to do meaningful calculations, "virtual" clusters can be created by combining clusters with similar taste signatures into one larger clusters for purpose of computing representativeness. In preferred such embodiments, clusters are successively added to the original cluster, and the representativeness recalculated as long as the representativeness number continues to rise with each iteration. When it declines, this process ends. The maximum representativeness number obtained in this way is the one assigned to the user.

Note 3: In various embodiments the discussed calculations are conducted at either the "artist level" or "item level". That is, in some embodiments the artists are rated and calculations done from those ratings and in others item ratings are used.

Bibliography

Klir, George and Folger, Tina. *Fuzzy Sets, Uncertainty, and Information*. Englewood Cliffs, NJ: Prentice Hall, 1988.

Manly, Bryan F.J. *Multivariate Statistical Methods, A Primer, Second Edition*. London, England: Chapman & Hall, 1994.

Hedges, Larry V. and Olkin, Ingram. *Statistical Methods for Meta-Analysis*. San Diego, CA: Academic Press, 1985.

Snijders, Tom A. B., Maarten Dormaar, Wijbrandt H. van Schuur, Chantal Dijkman-Caes, and Ger Driessen [1990]. "Distribution of Some Similarity Coefficients for Dyadic Banary Data in the Case of Associated Attributes." *Journal of Classification*, 7, pp. 5-31.

Example Embodiment 3

Clusters for Rapid Artist-Audience Matching

A portion of the disclosure of this patent document contains material which is subject to copyright protection. The copyright owner has no objection to the facsimile reproduction by anyone of the patent disclosure, as it appears in the PTO patent file or records, but otherwise reserves all copyrights whatsoever,

BRIEF SUMMARY

The purpose of this invention is to facilitate the existence and rapid growth of a Web site (or other form of electronic service) that will distribute entertainment works to their audience more effectively than other techniques.

Online services based on this invention will

Enable artists and entertainers to more efficiently find the consumers who will most enjoy their works Enable consumers to more efficiently find artists and entertainers they will enjoy (In some embodiments) Enable consumers of similar tastes to enjoy discussions with each other, and, in some embodiments, to interact with artists.

(In some embodiments) Enable individuals to play an entrepreneurial role in connecting artists to their audience, wherein they may be paid for their success.

(In some embodiments) Enable consumers and artists to enjoy the benefits of group buying: more sales to the artist and lower cost to the consumer.

DETAILED DESCRIPTION

Clusters: The Heart of The Invention

The centerpiece of this invention is clusters of users who have similar tastes. Users are enabled to find cluster that match their tastes, and artists are enabled to find the clusters where the users are who are likely to be interested in their work. Clusters thus serve as hubs of activity for particular tastes; in most embodiments ratings of items of interest to those tastes can be viewed, and various embodiments include various means for inter-user communication so that communities of people with similar tastes are formed.

Much of this disclosure will focus on music applications of the invention. However, this is merely for convenience, and applications to other fields, including works in the fields of writing and movies, fall equally within the scope of the invention.

User-Created Clusters

In the some embodiment individuals are enabled to create new clusters whenever they choose. One reason for doing so is that they believe that there is a group of people which is not adequately served by any of the existing clusters—for instance, because the tastes of people of this group are substantially different from the tastes represented by any of the existing clusters. The person creation a cluster will be known in this description as the "cluster initiator".

Means are provided for cluster creators to specify a taste of the cluster (which in some embodiments is later combined with taste information from other users as described elsewhere in this document). In one embodiment, he does so by specifying ratings for various items which he feels will be useful in defining the taste of the cluster. For example, he might give a recording of Bob Dylan's a rating of 0.95 (on a scale of 0 to 1) and a recording of Handel's Water Music a 0.1.

In another embodiment, he simply inputs a list of items which he feels will be the ones most-liked by members of the cluster. In many cases, these will represent his personal most-liked items. In a preferred embodiment, this list is ordered according to how well each item is liked relative to the others on the list.

Some software and network systems such as Napster and Gnutella enable file sharing, where files stored in the user's computer are made available for other users to download to their own computers. Usually, the songs a user has on his computer—and thus can make available for sharing—correspond to songs the user likes. Thus, the list of files he makes available for download can usually be presumed to represent a list of his likes, and used that way in computations. In some cases, of course, users will make songs they don't like available to other users, but some embodiments view this as happening infrequently enough that such problems may be ignored.

Then when users of the system are looking for a cluster that might be suitable for them, their tastes will be compared to that of this cluster as well as the old clusters. This new one may be the most suitable for a meaningful number of people.

In preferred embodiments, each cluster will have associated with it various facilities such as threaded discussion groups, chat, instant messaging, etc. These facilities will keep the users interested and motivate them to spend more time online. Spending this time online will provide more opportunities for advertising as well as more commitment to the cluster, increasing the probability of further online purchasing.

In some embodiments individuals are responsible for "moderating" and "administrating" these various facilities. This group may contain the cluster initiator. In many cases one person will play all these roles. For convenience, this person or group will be referred to here as the "cluster administrator."

Means are provided in such embodiments such that administrators, visitors, and members can provide reviews of items such as CD's which are in the subject domain of the service. In some embodiments, only a subset of these classes of users are enabled to input reviews; for instance, administrators and members.

When an item has more than one review, the usefulness of the system is enhanced by means of presenting the reviews to users in an optimal order. In the preferred embodiment, this order is based on the similarity between the user reading reviews and the user who wrote a particular review. Reviews written by authors who are closer to the reader appear earlier in the list.

Alternatively, the order can be dependent on the similarity of the author and the tastes of the cluster through which the item's reviews have been accessed.

In addition, in some embodiments means are provided for users to rate reviews. The system can use these ratings to determine the quality of a reviewer in general and/or the degree to which each individual user likes a particular reviewer. These factors can be used together with the similarity data, or in some embodiments, without it, to determine an ordering of reviews. For example, in one embodiment orderings are generated separately based on taste and quality. Percentile rankings are then calculated for each review. The percentiles between the two lists are averaged, and a new ordered list is created based on these average percentiles.

In some embodiments a summary of each reviewer's perceived goodness (determined by means of ratings or passive data acquisition such as measuring the average time spent reading a reviewer's reviews or the relative number of times a reviewer's reviews are sought out) is displayed.

Particular embodiments can use any means to combine the above factors. For instance, geometric or arithmetic averages can be computed, with or without weights.

In some embodiments, only a limited number of reviews are presented to users. These may be the ones that would have been presented first based on the ordering techniques described above. In some embodiments where only the "best" reviews are presented, the order in which those reviews are presented may be in date-of-creation or another order such as random.

In some embodiments, reviews are automatically (or optionally) posted to the Usenet or other publicly-available services with links back to the cluster service or the individual cluster through which the review was written. (In some embodiments, however, there is no particular association between reviews and individual clusters; rather the association is with the item or artist being reviewed, so that all reviews are available in all clusters.)

In some embodiments means are provided so the administrators are paid by users for access to their clusters. In various embodiments, these payments are one-time-only, per time period (such as monthly) or per access. Reviewers can be paid similarly for access to reviews written by that reviewer. Credit card payment mechanisms or other techniques such as micropayments can be used.

In addition, in some embodiments facilities are provided for purchasing items directly through the site (or through partner sites reached by hyperlink). In some embodiments means are provided for users to rate their satisfaction with such purchases, and in preferred embodiments display means are provided for users to see selected summaries of these ratings, such as the average rating for the cluster (including average ratings for reviews, product purchases, general satisfaction, and any other metric of cluster success).

In embodiments where users are enabled to purchase items, preferred embodiments include means for the one or more of the cluster administrators to be paid a portion of the purchase price of the items. In various embodiments, this is a fixed percentage, a percentage that various with volume or total revenues, or other variations.

In some embodiments advertising is used as an additional income stream.

In some embodiments, means are provided to enable a "group purchase" to be made wherein a number of users will purchase an item at once, thereby getting a lower price from the provider for the item. For instance, in some embodiments, means are provided for users to indicate that they would be willing to buy an item at a particular price. When enough users are willing to buy at a particular discounted price that the provider is willing to sell the item at that price, the transaction is carried through. In other embodiments, data is stored regarding the number of people who, having purchased an item by a particular artist in the past, and/or having reviewed or rated an artist at a particular level, were willing to buy a discounted item when such a deal was presented to them. This enables the system to predict an estimate of how many people are likely to buy a particular item by the same artist if offered at a discount. This enables the administrator to purchase a substantial number of copies at the item at once, at a discount, and to pass all or part of the savings on to purchasers. In some embodiments the software is able to automatically email all members of a cluster of such deals, or to screen its output to those who have bought items from that artist or very similar artists previously.

In some embodiments, users are able to provide ratings of clusters. However, in preferred embodiments, more weight is given to ratings from people whose ratings have higher calculated "representativeness." (The concept of representativeness is discussed elsewhere in this document.)

Automatically-Created Clusters

In preferred embodiments, automatically-created clusters exist instead of or in addition to user-created clusters. Note that some embodiments have the automatically-created cluster features described in this section along with a limited number of the other features of the invention which are described in this disclosure, or none of them. Automatically-created clusters have their own value independent of the other concepts described herein.

A technique for optimizing clusters based upon the principles of Shannon entropy will be described. Other techniques may be similarly applicable and also fall within the scope of the invention.

Appendix B contains instructions for creating clusters that maximize information transfer as that concept is described in the literature of Shannon entropy. The related Hartley information approach also contains information transfer calculations, and falls within the scope of the invention, but the Shannon approach is preferred.

For completeness, Appendix C gives the Python source code to a methodology that does not use information transfer. It is based upon the standard k-means clustering concept. This example is included to illustrate the wide range of clustering approaches that fall within the scope of the invention; however, the preferred embodiment uses Shannon entropy's information transfer calculations.

This disclosure uses the term "Automatically-Created" to refer not only to systems in which clusters are created by software without manual human intervention, but also to systems in which clusters are optimized by software.

In embodiments where clusters are actually created by the software, a preferred methodology is for the administrator to set the average number of songs desired per cluster. As new songs are added to the system, new clusters are automatically created such that the average number of songs remains approximately the same; the optimization process then populates the cluster. These clusters, in various embodiments, may start out empty before they are optimized, or may be initially populated with new songs or randomly chosen songs.

In order for the software to have data to base its optimizations on, user taste data must be collected. Some embodiments do this by means of allowing users to rate songs. Preferred embodiments do this by means of passive data collection. For instances, *.mp3 searches on the Gnutella network cause server to respond with a list of songs the user has made available for file sharing, which can be assumed, without too much error, to be a list of songs liked by that person. Radio UserLand does even better, broadcasting every song played by every user, allowing us to build a more detailed taste profile in a completely passive way. Various embodiments use various such means for data collection.

Some embodiments only allow recommendations or cluster information to be sent to processes that send realistic-seeming user data to the server. (For instance, most such embodiments would consider a process that continuously reports playing the same song to be unrealistic.)

One challenge is to associate data sent by particular processes with user identifiers that users can use to log on to Web sites. Preferred embodiments accomplish that by noting the IP address the user is accessing the Web site from, and seeing what passive data source, such as a Gnutella server, exists at the same IP address. In most such embodiments the user is then asked, via the Web interface, to confirm that he is using the type of data-broadcasting process that he is apparently using and asked whether the system has permission to link that data to his Web logon ID (or cookie, or other persistent identifier). In some embodiments, such as those involving passive data collection through Radio UserLand, a publicly available user ID for the data broadcaster is available, and that same user ID can be subsequently used by the user to log on to the Web site; the server can then easily link the data.

Distributed Processing for Automatically-Created Clusters

Preferred embodiments provide means for the computational load of the cluster calculations to be spread across more than one central processing unit.

In some embodiments, this is accomplished by having completely independent processes running on the various machines which all interact with the data as stored in a database system such as the open-source InterBase product. Each process randomly chooses a song, then finds the optimal cluster to move it to. If, when it is ready to perform the move, a check in the database indicates that another process has already moved it, then it cancels the move; otherwise it updates the database. In embodiments where more than one write needs to be performed against the database to facilitate the move, these actions are normally put into a single transaction. Using this procedure, a large number of computers can work together to perform the optimization more quickly. However, a portion of the work done will be wasted because the song in question was already moved by another process. This portion will be greater as the number of processes grows. Therefore it is preferable to have a more centrally controlled model.

Embodiments with centrally controlled models need an interprocess communication (IPC) method. Preferred embodiments use open standards such as XML-RPC and SOAP, since these enable clients to be written independently using a any of variety of programming languages. In some such embodiments, a server process waits for registration messages from remote client processes. When a client initializes itself, it communicates with the IP address and port of the server process. The client logs on with a persistent logon ID, or the server gives it a session ID when it first makes contact. Then a portion of the workload is assigned to the client.

Various embodiments use various methodologies for portioning out parts of the work to the various clients. In one such embodiment, the client is sent all data needed to describe all the clusters via IPC. Then, it is assigned responsibility for a certain number of songs. It finds the best clusters for those songs. It sends that data back to the server, which subsequently updates the database. At various intervals, the cluster description data is sent again to the client, containing the results of the simultaneous work done by the various other clients.

In some other embodiments, only the data for a subset of the clusters is sent to the client. Therefore, a set of clients is responsible for any particular song. Each client determines the best destination among the clusters it has the data for. Then the degree of goodness of the best choice is returned to the server by each client; the server determines "the best of the best" and updates the database accordingly.

One danger that arises in distributed processing embodiments is that a malicious client will be created that interacts with the server exactly as if it were a legitimate client. To avert this problem, preferred embodiments keep track of the average improvement in cluster quality per song movement. (For instance, in embodiments based on information transfer, this is based on the improvement in information transfer that occurs due to the movement.) When a client suggests a movement, the improvement associated with that movement is calculated by the server. If a client's suggestions tend to involve significantly less improvement in quality than is the norm, the system has reason to believe the client was either not written correctly or may even be malicious (trying to move songs inappropriately for the benefit of specific individuals or organizations).

The preferred embodiment accomplishes this by first storing the improvement per movement for trusted clients. These may be, for instance, clients running on the same machine as the server, under control of the system administrator. As the client sends suggested movements to the server, the server determines whether the client is to be trusted.

In the preferred embodiment, a client's suggestions are not added to the database until the client has had a chance to prove itself. The server waits until it receives 100 suggestions. The average improvement is calculated. This average needs to be within a desired range relative to the trusted average; for instance, an installation might desire that the client's average must be within 10% of the trusted value. If it is not, that batch of 100 suggestions is thrown away. Each batch of 100 suggestions is tested separately, in case a malicious client tries to fool the server by being "nice" for a while, followed by malicious behavior.

Other embodiments use other techniques for screening out malicious clients. In one such technique, the value of the last 100 suggestions is averaged for each client, and the clients are subsequently ranked from least valuable to most valuable. These rankings are updated whenever new suggestions come in from a client. The last 100 suggestions from the lowest-ranking 5% (or some other number) are always ignored. Still other embodiments calculate a Bayesian estimator of the value of the next suggestion. The suggestion is counted if and only if the Bayesian estimator is within a specified range compared to the trusted client, for instance, within 1%. Other techniques are used in still further embodiments.

One particularly simple approach, used in some embodiments, is for the server to simply check that the preferred embodiment increases overall information transfer.

In some embodiments where there are so many clients that the central server does not have the processing power to check on all the clients, some clients are assigned with the task of checking that other clients are not malicious. In most such embodiments, the central server assigns these checking tasks in such a way that the assigned checking client is unknown to the possible malicious client, so there is no way for the clients to collude to trick the server.

Human Input with Automatically-Created Clusters

Preferred embodiments do not rely only on software optimization of clusters. They allow users to suggest changes. These are only made if they result in an improvement to the clustering.

For example, in one such embodiments, a Web page is made available where all the songs in a cluster are listed with checkboxes beside them. (If there are too many songs in a cluster to fit on one page, multiple pages are used. Most search engines such as Google provide fine examples of how to manage a list output when the list takes more than one page.)

There is also an entry area whether user can enter an identifier for the destination cluster. In various embodiments, an identifying number of name may be entered, or there may be a pull down list if the number of clusters is small, or a more elaborate search mechanism is used.

The user checks some of the checkboxes, specifies the destination, and indicates he is ready to continue (for instance, there may be a Continue button).

The system then determines whether the suggested movement would improve the overall clustering. For instance, in embodiments which use information transfer to measure cluster quality, the information transfer that would result if the move were completed is calculated. If it is an improvement, the transfer goes through. Otherwise, it does not, and the user is informed that the transfer didn't go through. Preferred embodiments then let the user make adjustments to his suggestion; for instance, the song listing may be presented again with the checkboxes in the state the user left them in. He can then make alterations and click Continue again.

In preferred embodiments, the user can create a new cluster as the proposed destination. It would then be initially populated with the songs he selects, if doing so increases the quality of the clustering. Many such embodiments provide a user interface whereby the user can enter songs to populate the new cluster with, without regard to there original clusters. In most such embodiments the administrator can set an upper limit on the number of clusters that may be created in this way.

The embodiments discussed here thus join human input with computer optimization in such a way that the human input is smoothly integrated into the process. All accepted human input furthers the aim of improving the clustering.

Names for Automatically-Created Clusters

Preferred embodiments provide input means for users to name automatically-created clusters.

In one such embodiments, a page is presented in which there are 20 text input areas, each providing enough space to enter a name. When a name is entered into one of the text areas (and Submit is clicked), the name may not be removed except by an administrator for a period of one week. Next to each name is a set of radio boxes labeled "no opinion, poor, fair, good, excellent". Users can thus rate any or all of the names. User identification is carried out by means of a logon requirement, cookies, or other means; only 1 vote per user per name is allowed.

An overall rating for each name is determined by means of averaging the ratings, ignoring "no opinion" ratings.

After a name has been displayed for one week, if it is not among the top 50%, it is deleted, and any user can enter a new name. Only one name per user at a time is accepted in the list.

At any point in time, the highest-rated name is used as the name of the cluster, displayed wherever it is convenient to display such a name. In many embodiments a cluster number is also displayed, which is constant over the life time of the cluster, and therefore may be useful when a reliable way of identifying a cluster is needed.

User-Cluster-Similarity

In most embodiments, means are provided to compute a similarity between a user and a cluster.

In the some embodiments, users provide ratings that represent their tastes. In other embodiments purchase histories are used. In other embodiments, "passive" data collection such as tracking the artists and recordings that are downloaded and/or listened to can be used. In general, any source of information which captures the user's preferences in the target domain is acceptable; this includes taking note of the music files made available for Napster, Gnutella, or other types of file sharing In some embodiments, the "taste of the cluster," its "taste signature," is defined wholly by the administrator; in others it is defined by the members or even the visitors to the cluster, or by a combination thereof. The taste signature is stored in a database on the server. In some embodiments it takes the form of a list of artists or items considered to be "liked" by the cluster; in some embodiments this list is ordered with the most-liked items appearing at the top; in some embodiments ratings are associated with items and artists, for instance, on a scale from "excellent" to "poor".

In each of these embodiments, where data from various users are combined to form the taste signature, appropriate means are used. For instance, where ratings are used, the ratings for various items and artists are averaged; in some such embodiments, a weighted average is used with the administrator having a greater weight than other users. In embodiments where ordered lists are used, means for combining include converting the lists to percentile rankings, averaging the percentile rankings for each album, and outputting a new ordered list in order of the averaged percentiles.

When a users wants to make use of the system, he usually does so by finding clusters of taste similar to theirs and, in preferred embodiments, with other positive characteristics.

In preferred embodiments, means are provided to display a list of clusters together with descriptions of each cluster supplied by the administrator. These descriptions, in various embodiments take the form of text descriptors such as "Jazz, with a focus on old-style Dixieland", categories such as "Jazz", "Garage Rock", etc. or other means of communicating the center of the cluster.

In preferred embodiments, means are provided to search for clusters which users can believe they will be interested in. In embodiments where categories are provided, users can pick a category. In some embodiments where text descriptions are provided, users can search through these descriptions using standard text-retrieval techniques in order to find clusters relevant to their tastes.

In preferred embodiments, users can specify their personal tastes, and the system automatically lists clusters where the taste signature of the cluster is near to the taste signature of the user.

In preferred embodiments, when lists of clusters are presented based on any of the search techniques mentioned above, or other search techniques, the attributes mentioned above such as category and similarity to the user viewing the list are displayed, as may other cluster attributes which apply to the given cluster.

In some embodiments, "passive" data collection methods are used in matching clusters to users. These methods involve no special input of data indicating tastes.

In some such embodiments in the field of music, customizable Internet "radio" stations are associated with some or all clusters. Such stations play a mix of recordings using TCP/IP, multicasting, and/or other protocols to send streaming audio data (with additional video in some cases) to the user's computer where it is converted into sound. The recordings which are of the most interest to a cluster will tend to be played most often; the recording of least interest to the cluster, while still being "liked" by the cluster, will be played least often. Play rates can be used to tabulate ranks for items. In some embodiments, rank data is compiled for artists instead of, or in addition to, items. In most such embodiments, the administrator determines the play lists and relative frequency of playing various artists and cuts.

This rank data is then used for searching, whether acquired through manual user action or passively. In some embodiments, users input their favorite artists (or recordings, depending on the embodiment) in order of preference. In one embodiment, rank correlation is then used to find the closest matches, by computing the rank correlation for each cluster in turn and then picking the ones with the greatest level of correlation. In preferred embodiments, further processing is done to calculate p-values relative to the rank correlations, and the p-values closest to 0 indicate the closest match. (This is preferable because p-values seamlessly incorporate the number of artists or items in common on the lists being matched, as well as the degree of similar ordering.)

In other embodiments, other means are used to measure taste similarities based on this data. In some embodiments, for instance, rank data is converted into "ratings" data by dividing the rankings into groups and considering the items (or artists) in the group of highest ranks to have the highest rating, the items (or artists) in the $2^{nd}$-highest group of ranks to have the second-highest rating, etc. (There are an equal number of groups of ranks to the number of ratings; for instance, if there is a 5-point rating scale, one embodiment would assign the top 20% of items [or artists] to the highest rating, the next 20% to the next highest rating, etc.) Then rating-based techniques such as those described in U.S. Pat. No. 5,884,282 for measuring similarity are used.

In some embodiments, other types of data than rank or ratings data are used. For instance, in some embodiments, simple counts of the number of items (or artists) in common on the two lists are used; a higher number means more similarity of taste. It should not be construed that this invention depends on the use of any particular type of this "taste signature" data.

In embodiments where we have only "presence/absence" data available, such as a Napster file list in which a particular song is either present or absent, a variety of calculations can be used. While the invention should not be construed to be limited to any particular calculations, several will be listed for purposes of example: the Ochiai, Dice, and Jaccard indices. In calculating these indices, some embodiments consider the entire list of songs to be the combination of all songs contained in either the cluster in question or the user's liked list. The presence and absence are determined corresponding to this expanded list. Some other embodiments consider the master list to be the list of songs liked by the user; other songs are ignored. Thus in such embodiments the user only has "presence" indicated; whereas the cluster will usually have a mix of presence and absence. Other embodiments do the reverse, taking the cluster's list to be the master list. Some embodiments further calculate statistical significances with respect to such indices, by making use of the statistical distribution of the used index (Snijders 1990). In all these cases a number is calculated which corresponds to the degree to which the user's list of songs matches the clusters' list of songs.

In some embodiments, passive data collection is done on the user side, in addition to, or instead of, doing so on the cluster side. In some embodiments, for example, use is made of the fact that users often have MP3, CD, streaming audio, or other types of music players on their machines. Such players can be adapted by their programmers (and, in the case of open-source players, by any competent programmer) to store playback-based taste-signature data similar to that described for customizable Internet radio stations. In some embodiments this data is stored on the user's computer; in others it is stored on a central server. As noted earlier, lists of files made available for Napster, Gnutella, or other file sharing may be used. As before, rank correlation or other means, depending upon the embodiment, are used to determine the most appropriate clusters.

In some further embodiments, recommendations generated by clusters are integrated directly into the user interfaces of the users' players. For example, in some embodiments the software residing on the server is sent the playback data for a user, finds the most appropriate cluster, and sends the player software a list of the most highly-rated recordings. These recommendations are made available to the user (in one embodiment, by means of a pull-down menu; in another, by means of a scrolling list; in other embodiments, by other means) and the user can then choose the one he wants to hear. In various embodiments additional information may be included in the display, such as the name of the artist, the length of the song, etc.; in some embodiments, it is possible to click on a feature and be transported to a World Wide Web page with information on the recording.

In some embodiments, the user's player is sent the taste signature data associated with the various clusters and makes the decision about which cluster is most appropriate. This lessens privacy concerns because no complete record of a given individual's tastes needs to exist on the server to facilitate the recommendation process.

In some embodiments, the methods described here and other methods are used to measure similarities between individual users. For instance, in some embodiments these similarities are used to determine the order in which a user views reviews written by other users; the ones by users with the most similarity to the user reading the reviews are displayed first.

Cluster Membership

In preferred embodiments, users can become members of clusters. In some embodiments, members of clusters are given special access to certain facilities like chat rooms and discussion boards. In some embodiments they are given special pricing considerations when making purchases.

In typical embodiments, cluster members are known to the system by a logon ID and password. Members can join a cluster they are visiting by indicating that they wish to join; in some embodiments this is accomplished by checking an HTML checkbox.

Goodness List

In preferred embodiments, a goodness list is associated with each cluster. This somewhat corresponds to the top-40 song lists from decades ago.

Because a typical system might have hundreds or even thousands of clusters, the goodness list associated with each cluster will be highly targeted to particular tastes.

In some embodiments, manually entered ratings, supplied by the users, are averaged or otherwise combined to form the goodness score, and songs are listed in order of score.

In preferred embodiments, the necessary data is collected passively. In preferred embodiments, this data includes the number of times each user plays each song. Players or file sharing processes communicate their passively collected data to the server by using such common interfaces as SOAP, XML-RPC, or others.

At the time this disclosure is being written Radio UserLand broadcasts this data for its users by means of XML and any process that wants access to it can do get it by reading an XML file at a particular IP address. Radio UserLand broadcasts the time each song is played by each user; this data can be compiled to obtain a frequency of playing for each song.

Preferred embodiments use such data as follows. For each user:
The number of times he has played each song in the last week (or during some other chosen time period) is computed. (Over the entire population, this results in one count per user per song.)
Songs he has not played during that period are ignored in all following steps.
The user's played songs are ranked with respect to one another according to the number of plays.
A number between 0 and 1 is assigned depending on rank, in increments of 1/N, where N is the number of songs played at least once by the user. The most frequently played song has a ranking of 1, the least, a rank of 1/N. We will call these "unit ranks".

Then, for each song:
The geometric mean of the unit ranks is computed. This is done by multiplying the unit ranks, and computing the Mth root of the product, where M is the number of unit ranks that were multiplied. This geometric mean is considered to be the "goodness" of the song.

The number computed for each song as described above has two main advantages over other known approaches:
Because of the ranking process, a particular user who tries to maliciously skew the process by playing a particular song an overwhelmingly huge number of times does not end up having any greater effect than another user who played the song only a little more frequently than other songs.

By using the geometric mean to compute the goodness, the songs with the highest goodness values are the songs that most consistently achieve high play rates among users who have heard them. This consistency is important, because our aim is to create a goodness list that is very reliable. Ideally, a top-ranked song in the goodness list of a cluster will be very likely to appeal to everyone who feels an association to that cluster. Geometric means accomplish that aim.

Some embodiments take the geometric mean methodology a further step, and treat the ranks as p-values. These p-values are with respect to the null hypothesis that the song has no particular tendency to be ranked above average compared to other songs. Then, the product of these p-values has an approximately chi-square distribution with 2M degrees of freedom. So, instead of taking the Mth root, we use the chi-square distribution to calculate a resultant "combined" confidence level, represented by another p-value. This resultant p-value can then be used as the goodness. Under this goodness measurement, the songs with the highest goodness would be even more reliably liked by a user with an affinity for the cluster than using the geometric mean method.

The problem with the chi-square method is that songs with a lot of people hearing them tend to generate better confidence levels, because there is more data to generate confidence from. This prejudices that goodness measure against new songs that few people have heard, even if they play the song extremely frequently.

However, in some embodiments, it is still considered worthwhile to display the chi-square-based goodness, to be as confident as possible that the top-ranked songs will be liked by nearly anyone who hears them, even though some even better newer songs will not get the attention they deserve.

In some embodiments, more than one goodness list is displayed, usually along with text describing the advantages and disadvantages of each one. For instance, once such embodiment displays the chi-square-based list with the heading "Old Reliable—You'll Be Sure To Like The Top Listed Ones Here!" and displays the geometric-mean-based ones with the heading: "Hottest of the Hot—The Top Ones Tend To Be Newer Songs Loved By Everyone Who's Heard Them!"

Some embodiments display other measures, some of which are more akin to traditional popularity measures, such as ranking the songs according to the number of people who have heard each one or the total number of plays it has received. Some embodiments display such numbers with the data restricted to users associated with the cluster; some do so over the entire population. Any combination of measures can be displayed.

In general, any measure that conveys the degree to which a song is popular or liked can be used.

These measures are often most valuable when the input data is restricted to members of the cluster for which they are being displayed. For instance, someone who loves serious, literary folk music may dislike all disco music. If for some reason he downloads a disco song and plays it once, he probably wouldn't play it again. But that should not cause the song to have a low goodness in lists that are displayed in a cluster that appeals to disco lovers.

Note that in some embodiments, there is no time window for the data to be considered by these calculations; in others older data is given less weight according to a decreasing scale, such as using half-life calculations for the data based upon the exponential distribution. (Given a chosen half-life, such as 30 days, one can compute the decay for any point in time using the exponential distribution. For our example, 30 days would have a decay of 0.5; days less than 30 would have decay values between 1 and 0.5; days greater than 30 would have decay values between 0.5 and 0.) This decay is an appropriate weight for the data points. If arithmetic averaging is used, the decay for each ranking is multiplied by the unit ranking. If geometric averaging is used, the unit ranking is used as a power for the ranking. Other decreasing scales may also be used. Different lists may have different scales. For instance, an "Old Reliable" list may have a window of one year, or include all relevant data ever collected, and a "Hottest of the Hot" list for the same cluster may have a window of one week.
Radio In some embodiments each cluster broadcasts its songs as many services on the Web broadcast songs using such formats as streaming mp3 and Real Audio. In some embodiments the administrator of a cluster can turn this feature on or off for a given cluster.
All-You-Can-Eat Services At the time of writing of this disclosure, many people in the Internet industry believe that a time will come when users will be able to access any song they want at any time, and either download it or play it in a streaming manner. Napster enables anyone to download any of a very great number of songs at any time for no charge, but its legality is in question because record companies and artists are not being reimbursed. It is generally expected in the industry that paid services will shortly come into existence that give users similar benefits as those provided by Napster today, but legally. It is usually envisioned that a flat fee will be involved, akin to a monthly cable television bill. Cable TV is all-you-can-eat in the sense that for one fixed fee, the consumer gets to watch as much TV as he wants. The expected network-based music services are expected to also be all-you-can-eat in the sense that users can have access to as much music as they want for a fixed fee.

A marketplace may evolve in which artists charge such services different amounts based on their popularity. A relatively unknown artist might charge less than a better-known artist.

The service described in this disclosure can, in such a marketplace, be of use to all-you-can-eat services because the goodness measures can be used to determine who is good, regardless of the present popularity. Thus, an all-you-can-eat service can save money by marketing relatively unknown, but good, artists to its users; the more the users choose to download or listen to lesser-known artists, the more the service saves.

Recommendations

In some cases, users will not want to have to think about clusters. They will simply want recommendations of songs.

Elsewhere in this disclosure means of measuring user-cluster-similarity are discussed. Recommendations are then made, in some embodiments, by finding the cluster(s) most similar to the user, and recommending the best songs in those clusters, according to the goodness measure used by the particular embodiment.

For instance, in some such embodiments, means such as the Ochiai presence/absence index are used to calculate a user-cluster similarity number where a higher value means more similarity, and a goodness calculation within each cluster is also performed, such as using the geometric mean of unit ranks, where a higher value means more goodness. The two numbers are then multiplied; we will call the result the recommendation priority. Recommendations are subsequently made in descending order of the recommendation priority.

If it is desired to give more weight to one of these factors, it can be taken to a power. The power can be tuned over time. One way to do that is to try different values, assigning each value for a significant period of time, such as a month. The more appropriate the power, the higher the following number will be: The average of (the recommendation priority times some passive or active measure of how much the user likes the song). For instance, in embodiments involving Radio User-Land, for each recommended song that the user has not heard before, we multiply the number of times the user actually plays it in the first week after receiving the recommendation by its recommendation priority, and compute the average of those numbers. The higher that average is, the better the weight is. After trying a number of weights over a period of time, the best one is chosen.

Other ways of combining the two numbers for calculating the recommendation priority are used in various other embodiments, such as adding them; and in still further embodiments, other methods are used, such as only picking one cluster for recommendations and then ordering them by goodness.

Artist Tools

Items may be submitted by artists for examination by cluster administrators, possibly leading to ratings, reviews, or other consideration. In some embodiments special forms, such as Web form input, are provided for this purpose.

In preferred embodiments, means are provided to give artists some control over their "persistent reputations" as determined by ratings and reviews. In some such embodiments artists are given means to specify the clusters that may request or display reviews and ratings of their works. In further embodiments, clusters that cannot display or request reviews for an artist cannot receive submissions from him.

In order to assist artists in directing their submissions to appropriate clusters, preferred embodiments provide special tools. Preferred embodiments use taste-based searching. In one such embodiment, a form (such as a Web input form) is provided which allows an artist to list similar artists. The clusters with most-liked-lists with the most artists in common with the artists' list are the best ones to submit to. In a further embodiment, these similar artists are listed in order of similarity. The rankings are then matched against the cluster's rankings on their ranked most-liked-lists using rank correlation. In still another embodiment, artists rate other artists regarding their similarity, and the cluster stores ratings of artist according to their perceived goodness. The scale may be for instance, a 7-point scale from "Excellent" to "Fair" in each case; although in one case similarity to a given artist is measured and in another case "goodness" seems to be measured, in fact the "goodness" measure is really similarity to the tastes of the given cluster. So the clusters with the best matches on these ratings are the ones to submit to in that embodiment. In general, the various techniques mentioned earlier for enabling users to find appropriate clusters may also be used for artists, including deriving lists of songs from the files made available by the artist for file sharing via Napster, Gnutella, or other means, and/or using presence/absence indices. It should not be construed that this invention is limited to any particular means for taste-based searching.

In some embodiments, artists are given means to indicate that they wish to pay a particular individual to listen to, rate and/or write a review of their work. In some further embodiments, they can read the review and decide whether it is to be displayed online. In some embodiments, means are provided such as online credit card payment or checking account withdrawal through which the individual reviewer can be paid for doing the rating/review. In order to help the artist decide which user to ask for a rating and/or review, users (who may be Administrators or other users), each have information available online which would help to indicate their suitability. First, if they are members or administrators of relevant clusters, that provides a first level of filtering indicating that their tastes are probably consistent with the interests of the artist. In some embodiments, previous reviews by the user are available in one easily-accessed list. In addition, in some embodiments, if the user has entered his own ratings or explicit or implicit list of most-liked-artists, whether ordered or unordered, the artist can use his own similar information (with regard to similarity of various works to the artist's own work or simply with regard to the artist's own personal likes) to request that the system generate a calculated indicator of appropriateness, similar to that used when users are searching for appropriate clusters. In some embodiments artists can search for appropriate users using these means without consideration of clusters. Features are provided for helping the artist made informed choices about which users to submit their items to for review. In some embodiments, artists are given input means to rate users on their satisfaction with the ratings and reviews they have paid for. Other artists can see summaries of these ratings, for instance, in one embodiment, averages of the ratings, in order to judge who to pay. (For instance, a reviewer may write a negative review but not make it public, and make it a useful critique of the work, which the artist can use in refining his work in the future; such a review might be negative but still valuable.) In some embodiments, users can set their own fees for reviewing and/or listening.

In addition, in some embodiments, a rating reliability number is calculated for users. This allows artists and other users to know how reliable a particular user's ratings are, helping artists judge whether to submit their items for rating and review by a particular user, and helping users decide which other users' ratings and reviews to read. See Appendix A for more detail. Preferred embodiments, information is not given to the artist that will enable him to choose reviewers who only review highly. For instance, a preferred embodiment only enables artists access to each reviewer's reliability data and cluster membership. Artists will then be motivated to pick reliable reviewers, as compared to reviewers who often disagree with the majority, but they will not have a means to predict reviewers who only rate highly. Of course, in such an embodiment, an identifier for a reviewer that would enable the artist to associate him or her with particular displayed reviews would not be made available.

In a preferred embodiment, the system keeps track of the songs a user has been paid to listen to. It notes that user's relative play frequency for the songs in the weeks immediately after being paid, and the play frequencies in the cluster(s) to which the songs belong after some time has passed, for instance, 6 months, and the songs have had a chance to become known. Then, the rank correlation is calculated between the user's play frequency and the cluster's. This correlation is then used as the basis for recommending people to artists to pay to listen to their songs. To have a high correlation, the user must a) actually listen to the songs he is paid to listen to, and b) judge them similarly, relative to each other, to the way the cluster membership as a whole ultimately judges those same songs relative to each other. This embodiment is particularly appropriate in conjunction with the feature that displays songs ranked according to their average frequency of play among those who have heard the song at all (or other similar features). It means that one user or a small number of users can be paid to hear a song, and if they like it, it will immediately be catapulted to the top of the goodness list for a cluster, encouraging still more people to listen to it, enabling good songs to become popular very quickly.

In some embodiments, artists don't have a choice regarding who they pay. Instead, the artist pays a fee, and the system decides the best people to expose the work to and/or extract ratings from. This simplifies things on a number of levels—there can be a less complicated user interface, and the artist needs to do less work. In some embodiments, artists are presented with information to the effect that, for a certain fixed fee per listener, we will pay as many people as he desires (within limits of availability) to listen. Other embodiments enable listeners to set their fees, and the system chooses based upon the fees and calculated reliability associated with each one.

Various forms of payment can be used in various embodiments. For instance, in some embodiments, money is not transferred, but instead an artist promises to make a certain number (or all) of his future recordings available to the listener for low or no cost.

In some embodiments, an "appropriate submission rating" is associated with each artist. Users rate artists with respect to the appropriateness of submitting the given item to the given user for ratings and review, which depends upon how well the item corresponds to the tastes of the user who is being to rate or review. The idea is to create a persistent record of the appropriateness of an artist's submissions in order to discourage him from "spamming" the clusters by submitting too broadly. Users can see a summary of appropriate submission ratings for the artist in question; in some embodiments this is a simple average; in others, it is a Bayesian estimator of the expected rating; in other embodiments, other summarization methods are used. Similarly, artists can see summaries of the appropriate submission ratings generated by various users; this helps them avoid submitting to users who tend to give inappropriately low ratings.

In some embodiments, there is a new songs list. This list simply lists songs that a relatively new, so that people who are interested in listening to new material can do so. This feature may appear in embodiments which do not contain any features for reimbursing those who listen to songs. In some embodiments where appropriate submission ratings are included, the songs may be listed in order of the measured appropriateness of the artist's past submissions. In further embodiments, artists with the worst appropriateness measures may not be allowed to submit at all. Also, in some embodiments, artists who have submitted a certain number of songs in the past must have achieved a certain measured popularity if they are to be able to continue submitting. For instance, the average number of playings per week of the user's past submissions can be used; if it is below a certain point, no further submissions need be allowed. These calculations can be conducted globally or within the cluster membership. In order to keep this list from becoming too crowded, various means are used, such as always including songs for a limited, fixed set of time. It should not be construed that the role of an artist in this specification could not be played by some other stakeholder in the artist's success, who would use the system for promotion; such an entity could be termed a "promoting user."

Importance of the Administrator

In some embodiments, the administrator plays a role much like that of a radio "DJ." The administrator, sometimes called a "guide" in such embodiments, plays a role in which his own personality and tastes given high visibility. For instance, in some such embodiments, the administrator of a cluster is the only person who is enabled to provide ratings and reviews which are visible to visitors and members of the cluster. In such embodiments, administrators of different clusters compete with each other for the reputation of being the best and most reliable raters and reviewers; reliability is measured as discussed elsewhere. In further embodiments, non-administrators can provide ratings and reviews, but these are given subordinate visibility to those generated by the administrator.

System Environment

In various embodiments, the system runs on the World-Wide-Web, client-server systems based on the TCP/IP or other communications protocols, as a multi-user program accessed by users through terminal emulators, or other technical means. In all embodiments, one or more CPU's run the system, and users are enabled to access it from remote sites through an appropriate means of communication.

GLOSSARY

Item: An article of the subject matter covered by a particular system. In various embodiments, an item can be a song, an album, a recording artist, a book, an author, a video, a director, an actor or actress, a painting, etc.

User: A person accessing the system.

Artist: Creator of items. For instance, the artist Herman Melville created the item "Moby Dick."

Cluster: A cluster is primarily defined by its taste. In various embodiments, clusters have associated facilities such as chat rooms, discussion groups, item purchase facilities, etc.

Cluster Visitor: A user who is using the facilities of a cluster but who has not been registered with the cluster as a member.

Cluster Member: A member has registered by indicating that he wants to join the cluster. In some embodiments, his taste is used in refining the taste of the cluster. In various embodiments members have special rights, such as the right to post to a cluster discussion group or the right to take special discounts when making purchases.

Cluster Administrator: The person or group of people who (in some embodiments) defines the taste of the cluster, moderates chat and discussion rooms, sends notices of events, etc. In some further embodiments, the taste defined by the administrator is further refined by members and/or visitors.

Taste of the cluster: In some embodiments, defined by the cluster administrator. In other embodiments, it is specified only by members by such means as averaging ratings for various items in the subject domain; in still other environments tastes specified by the administrator and members are combined to form the taste of the cluster. Tastes are specified and calculated as described in the text of this disclosure.

Bibliography

Klir, George and Folger, Tina. *Fuzzy Sets, Uncertainty, and Information*. Englewood Cliffs, NJ: Prentice Hall, 1988.

Manly, Bryan F.J. *Multivariate Statistical Methods, A Primer, Second Edition*. London, England: Chapman & Hall, 1994.

Hedges, Larry V. and Olkin, Ingram. *Statistical Methods for Meta-Analysis*. San Diego, CA: Academic Press, 1985.

Snijders, Tom A. B., Maarten Dormaar, Wijbrandt H. van Schuur, Chantal Dijkman-Caes, and Ger Driessen [1990]. "Distribution of Some Similarity Coefficients for Dyadic Banary Data in the Case of Associated Attributes." *Journal of Classification*, 7, pp. 5-31.

The invention claimed is:

1. A system for determining high quality musical recordings, comprising:
    a server computer which communicates with a plurality of client devices configured to execute internet radio client software which plays musical recordings;
    said server computer comprising:
        a registration unit for registering users;
        an input unit for registering, for each one of said users, and for each musical recording of a selected group of musical recordings, said user's opinion of said musical recording, wherein said selected group of said musical recordings comprises musical recordings for which said user has provided input representing an opinion;
        a combining unit configured to combine a user's registered opinion of each musical recording of said selected group of musical recordings with the registered opinions regarding said musical recording of others of said users, whereby a community opinion of each musical recording is generated;
        an input valuation unit configured to assign a valuation to the registered opinion of each of said users on the basis of data from the combining unit, including how representative the registered opinion is of the community opinion;
        wherein said input valuation unit is configured to assign a valuation based at least in part on a weight calculated based on the timeliness of the registered opinion of at least one of said rating users, wherein said weight is zero if the registered opinion is the first and only registered opinion; and
        a reward unit for providing a reward to at least one of said users on the basis of the valuation provided by the input valuation unit of at least one registered opinion of said at least one of said users.

2. The system of claim 1, wherein said reward is a prize delivered to said at least one of said users.

3. The system of claim 1, wherein at least one of said opinions is registered based on input received from a client device communicating that the user thereof has performed the act of skipping over part of said musical recording while listening to said internet radio client software.

4. A system for determining high quality musical recordings, comprising:
    a server computer which communicates with a plurality of clients;
    said server computer comprising:
        a registration unit configured to register users including rating users;
        an input unit configured to register, for each one of said rating users, and for each musical recording of a selected group of musical recordings, said rating user's opinion of said musical recording, wherein said selected group of said musical recordings comprises musical recordings for which said rating user has provided input representing an opinion;
        a combining unit configured to combine a rating user's registered opinion of each musical recording of said selected group of musical recordings with the registered opinions regarding said musical recording of others of said rating users, whereby a community opinion of each musical recording is generated;
        an input valuation unit configured to assign a valuation to the registered opinion of each of said rating users on the basis of data from the combining unit, including how representative the registered opinion is of the community opinion;
        wherein said input valuation unit is configured to assign a valuation based at least in part on a weight calculated based on the timeliness of the registered opinion of at least one of said rating users, wherein said weight is zero if the registered opinion is the first and only registered opinion; and
        a reward unit configured to provide a reward to at least one of said rating users wherein the choice of which of said users is rewarded is influenced by the valuation provided by the input valuation unit of at least one registered opinion of said at least one of said rating users.

5. The method of claim 4, wherein:
    said registration unit is further configured to register paying users; and
    said reward from said reward unit includes a payment made by at least one of said paying users.

6. The method of claim 5, wherein:
    said reward unit is a public reputation unit configured to publicly enhance a reputation associated with at least one of said rating users.

7. The method of claim 5, wherein said reward is a prize.

8. The method of claim 4 further wherein:
    said input valuation unit is further configured to compare the registered opinion of at least one of said rating users to sales values.

\* \* \* \* \*